(12) United States Patent
Terada

(10) Patent No.: US 11,092,475 B2
(45) Date of Patent: Aug. 17, 2021

(54) LIQUID LEVEL DETECTING DEVICE AND METHOD OF MANUFACTURING SAME

(71) Applicant: DENSO CORPORATION, Kariya (JP)

(72) Inventor: Yoshifumi Terada, Kariya (JP)

(73) Assignee: DENSO CORPORATION, Kariya (JP)

( * ) Notice: Subject to any disclaimer, the term of this patent is extended or adjusted under 35 U.S.C. 154(b) by 237 days.

(21) Appl. No.: 16/379,825

(22) Filed: Apr. 10, 2019

(65) Prior Publication Data

US 2019/0234789 A1 Aug. 1, 2019

Related U.S. Application Data

(63) Continuation of application No. PCT/JP2017/036567, filed on Oct. 10, 2017.

(30) Foreign Application Priority Data

Oct. 13, 2016 (JP) .............................. JP2016-201989

(51) Int. Cl.
*G01F 23/36* (2006.01)

(52) U.S. Cl.
CPC .................................. *G01F 23/36* (2013.01)

(58) Field of Classification Search
CPC ...................................................... G01F 23/36
See application file for complete search history.

(56) References Cited

U.S. PATENT DOCUMENTS

2019/0257684 A1*  8/2019  Terada ................... G01F 23/32

FOREIGN PATENT DOCUMENTS

| JP | 2005345113 A |   | 12/2005 |
|----|--------------|---|---------|
| JP | 5376980 B2   |   | 12/2013 |
| JP | 2018-72300 A | * | 3/2018  |

* cited by examiner

*Primary Examiner* — John Fitzgerald
(74) *Attorney, Agent, or Firm* — Harness, Dickey & Pierce, P.L.C.

(57) ABSTRACT

A liquid level detecting device includes the segment electrodes with which the sliding contact is in sliding contact according to the movable body's movement, an output electrode that produces an electrical output corresponding to an electrical resistance between the sliding contact and the output electrode, a resistive element having a higher resistance than the segment electrodes and located across the segment electrodes and the output electrode to be electrically connected thereto, and adjustment electrodes provided on the mounting surface corresponding to the electrode groups respectively. The adjustment electrode is electrically connected to a specific electrode, which is a specific segment electrode in a corresponding electrode group, to have its electrical resistance adjusted in advance with respect to the output electrode. The circuit board includes a cut mark recessed from the mounting surface between the segment electrodes other than the specific electrode in each electrode group and a corresponding adjustment electrode.

8 Claims, 19 Drawing Sheets

LIQUID LEVEL DETECTING DEVICE AND METHOD OF MANUFACTURING SAME

CROSS REFERENCE TO RELATED APPLICATIONS

The present application is a continuation application of International Patent Application No. PCT/JP2017/036567 filed on Oct. 10, 2017, which designated the United States and claims the benefit of priority from Japanese Patent Application No. 2016-201989 filed on Oct. 13, 2016. The entire disclosures of all of the above applications are incorporated herein by reference.

TECHNICAL FIELD

The present disclosure relates to a liquid level detecting device for detecting a liquid level of a liquid in a container, and a method of manufacturing the same.

BACKGROUND

A liquid level detecting device in which multiple segment electrodes arrayed in a movement direction of a movable body reciprocating following a liquid level are provided on a mounting surface of a circuit board has been widely known.

SUMMARY

A liquid level detecting device in a first aspect of the present disclosure for detecting a liquid level of liquid in a container includes a movable body that includes a sliding contact and is configured to reciprocate according to the liquid level, a circuit board that includes a mounting surface and is positionally fixed to the container, a plurality of segment electrodes that are provided on the mounting surface to be aligned in a movement direction of the movable body, the sliding contact coming into sliding contact with the plurality of segment electrodes according to a movement of the movable body, an output electrode that is provided on the mounting surface and is configured to produce an electrical output corresponding to an electrical resistance between the sliding contact and the output electrode, a resistive element that is provided on the mounting surface and has a higher electrical resistance than the plurality of segment electrodes, the resistive element being located across the plurality of segment electrodes and the output electrode to be electrically connected to the plurality of segment electrodes and the output electrode, the plurality of segment electrodes arranged in the movement direction being grouped together to define a plurality of electrode groups each of which includes a predetermined number of segment electrodes, and a plurality of adjustment electrodes that are provided on the mounting surface corresponding to the plurality of electrode groups respectively. Each of the plurality of adjustment electrodes is electrically connected to a specific electrode, which is a specific segment electrode in a corresponding one of the plurality of electrode groups, to have its electrical resistance adjusted in advance with respect to the output electrode. The circuit board includes a cut mark recessed from the mounting surface between the predetermined number of segment electrodes other than the specific electrode in each of the plurality of electrode groups and a corresponding one of the plurality of adjustment electrodes.

A method in a second aspect of the present disclosure is for manufacturing the liquid level detecting device in the first aspect and includes an electrode forming step, in which all of the predetermined number of segment electrodes in each of the plurality of electrode groups are formed to be electrically connected to a corresponding one of the plurality of adjustment electrodes, and a resistance adjustment step, in which portions between the predetermined number of segment electrodes other than the specific electrode in each of the plurality of electrode groups and a corresponding one of the plurality of adjustment electrodes are cut to form the cut mark recessed from the mounting surface, adjusting the electrical resistance between each of the plurality of adjustment electrodes for a corresponding one of the plurality of electrode groups and the output electrode.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
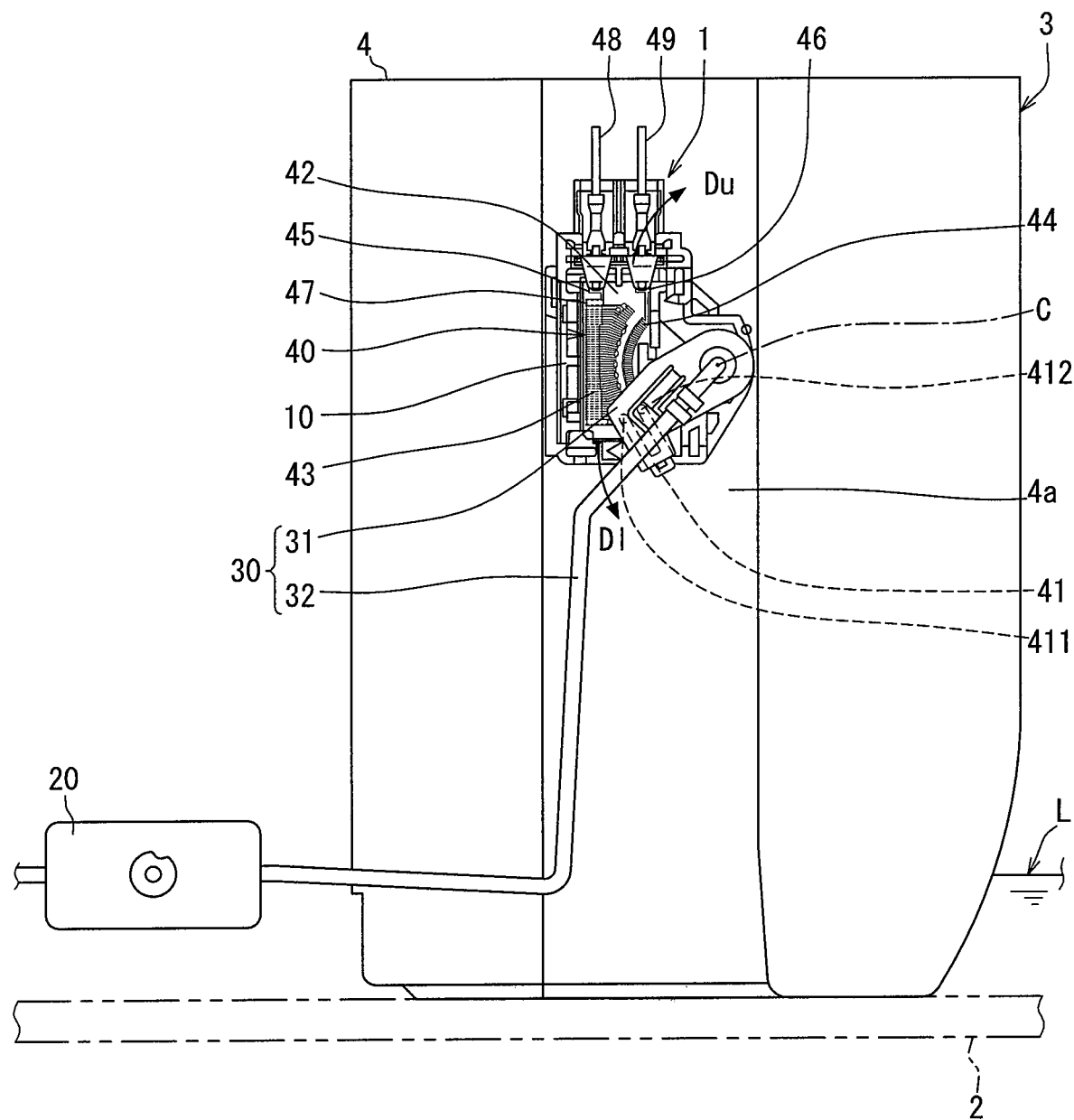
FIG. 1 is a front structural view showing a liquid level detecting device according to a first embodiment.

Hereinafter, a plurality embodiments will be described with reference to the drawings. Incidentally, the same reference numerals are assigned to the corresponding components in each embodiment, and thus, duplicate descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined even if they are not explicitly shown if there is no problem in the combination in particular.

In an exemplary liquid level detecting device, a resistive element and an output electrode are provided on the mounting surface of the circuit board. In this example, the resistive element is given a higher electrical resistance than that of the segment electrodes, and is electrically connected across the segment electrodes and the output electrode. As a result, an electric output supplied from the output electrode represents the liquid level in accordance with an electrical resistance between the output electrode and a sliding contact which slides in contact with the segment electrodes in accordance with the movement of the movable body.

In the above exemplary liquid level detecting device, a connection portion electrically connecting between the segment electrodes is disconnected for each of the segment electrodes, to thereby adjust the electrical resistance between the sliding contact and the output electrode in advance. However, it is conceivable that the execution of a cutting process at multiple points between the segment electrodes to determine the electrical resistance for each of the segment electrodes causes a reduction in productivity. Moreover, since the electrical resistance of each segment electrode is changed in accordance with the product specification, the reduction in productivity is accelerated.

First Embodiment

As shown in FIG. 1, the liquid level detecting device 1 according to a first embodiment is installed in a fuel tank 2 as a "container" mounted on a vehicle. The fuel tank 2 internally stores a fuel as a "liquid" to be supplied to an internal combustion engine of the vehicle. Therefore, the liquid level detecting device 1 detects a liquid level L of the fuel while being held by a sub-tank 4 of a fuel pump module 3 at a position immersed in the fuel in the fuel tank 2. In this example, the sub-tank 4 is installed in the fuel tank 2 to constantly store the fuel to be supplied to the fuel pump module 3, so that the fuel to be supplied to the internal combustion engine can be continuously supplied to the fuel pump module 3. Therefore, the liquid level detecting device 1 can detect the liquid level L of the fuel in the fuel tank 2 by being attached to an outer peripheral wall 4a of the sub-tank 4.

Specifically, the liquid level detecting device 1 includes a body 10, a float 20, a movable body 30, and a variable resistance unit 40. In the following description, a vertical direction of the vehicle on the horizontal plane is assumed to be a vertical direction of the liquid level detecting device 1 shown in FIG. 1.

The body 10 is made of a fuel-resistant resin material such as polyacetal resin. The body 10 has a plate shape that is long in the vertical direction as an overall. The body 10 is held by the outer peripheral wall 4a of the sub-tank 4 so that the body 10 is positionally fixed to the fuel tank 2 through the fuel pump module 3.

The float 20 is made of a lightweight rubber material such as foamed ebonite. The float 20 is formed in a block shape having a specific gravity smaller than that of the fuel. The float 20 floats on the fuel level in the fuel tank 2 and moves up and down to a position corresponding to the liquid level L.

The movable body 30 includes a rotor 31 and an arm 32. The rotor 31 is made of a fuel-resistant resin material such as polyacetal resin. The rotor 31 is formed in a plate shape rotatable about a rotation center line C substantially perpendicular to the vertical direction. The rotor 31 is rotatable about the rotation center line C by being pivotably supported by the body 10.

The arm 32 is made of a hard metal material such as stainless steel. The arm 32 is formed in a bent rod shape that bends at multiple points corresponding to the shape of the fuel tank 2. The arm 32 is connected between the float 20 and the rotor 31. As a result, the rotor 31 together with the arm 32 can be rotated forward and backward around the rotation center line C so as to follow the vertical movement of the float 20. In other words, the movable body 30 including the arm 32 and the rotor 31 can reciprocate following the liquid level L in movement directions Dl and Du which are forward and backward rotation directions around the rotation center line C.

In this example, one movement direction Dl is set in a counterclockwise direction of FIG. 1 which is toward a lower side as the liquid level L decreases more, and the other movement direction Du is set in a clockwise direction of FIG. 1 which is toward an upper side as the liquid level L increases more. At both side movement ends in the movement directions Dl and Du, an end portion of the arm 32 opposite to the float 20 is locked by the body 10. As a result, a reciprocable range of the movable body 30 including the arm 32 is limited to a predetermined limit angle range.

Figure 2:
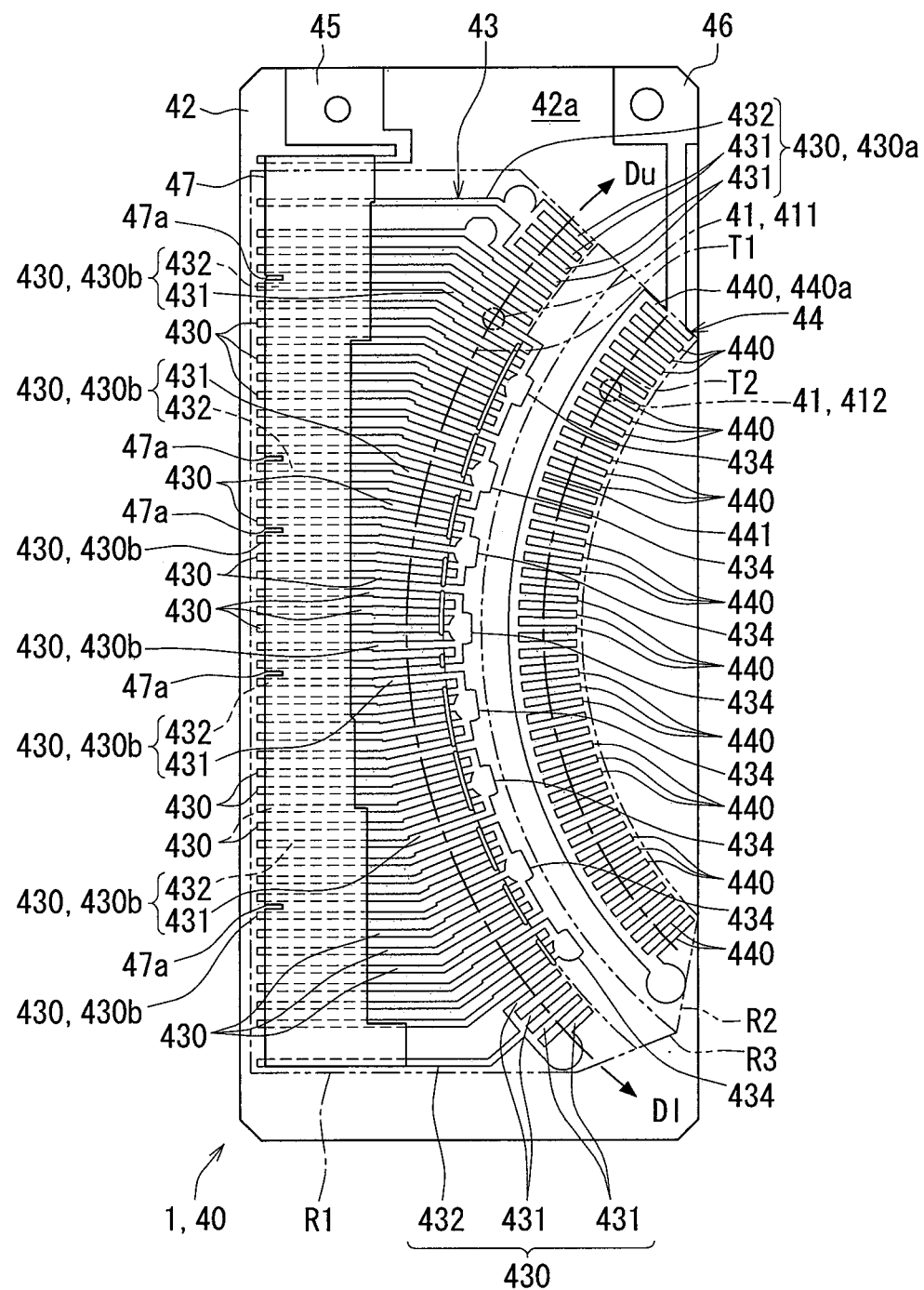
FIG. 2 is a front structural view showing a variable resistance unit according to the first embodiment.

As shown in FIGS. 1 and 2, the variable resistance unit 40 includes a movable electrode 41, a circuit board 42, fixed electrodes 43 and 44, output electrodes 45 and 46, a resistive element 47, and terminals 48 and 49.

The movable electrode 41 shown in FIG. 1 is made of a conductive metal material such as a copper alloy. The movable electrode 41 has a plate shape, for example, a substantially U-shape or the like, which has an elastically deformable flexibility at both end portions. An intermediate portion between both end portions of the movable electrode 41 is integrally rotatably held on a side of the rotor 31 facing the body 10.

Sliding contacts 411 and 412 are provided at both end portions of the movable electrode 41. As shown in FIG. 2, trajectories T1 and T2 passing through the respective sliding contacts 411 and 412 by the reciprocating movement of the movable body 30 are formed in an arc-like fashion along the movement directions Dl and Du within a limited angle range around the rotation center line C. In this example, the first trajectory T1 through which the first sliding contact 411 passes is provided in the radially outer side of the second trajectory T2 through which the second sliding contact 412 passes.

The circuit board 42 is made of, for example, an insulating ceramic material such as alumina. The circuit board 42 has a substantially rectangular plate shape long in the vertical direction. The circuit board 42 is held by the body 10 in a state facing the rotor 31 and the movable electrode 41. The circuit board 42 has a flat mounting surface 42a on one side facing the rotor 31 and the movable electrode 41. The circuit board 42 is held by the body 10 with the mounting surface 42a facing the movable electrode 41. As a result, the circuit board 42 is positionally fixed to the fuel tank 2 shown in FIG. 1 through the body 10 and the fuel pump module 3.

The fixed electrodes 43 and 44 and the output electrodes 45 and 46 shown in FIG. 2 are made of a silver-based conductive metal material containing, for example, palladium or platinum. The fixed electrodes 43 and 44 and the output electrodes 45 and 46 are formed to have a substantially uniform thickness thinner than that of the circuit board 42 by printing a paste of such a conductive metal material on the mounting surface 42a and then performing a baking process. The fixed electrodes 43 and 44 and the output electrodes 45 and 46 are provided in the form of thin films having substantially the same thickness by print formation on the mounting surface 42a.

Figure 5:
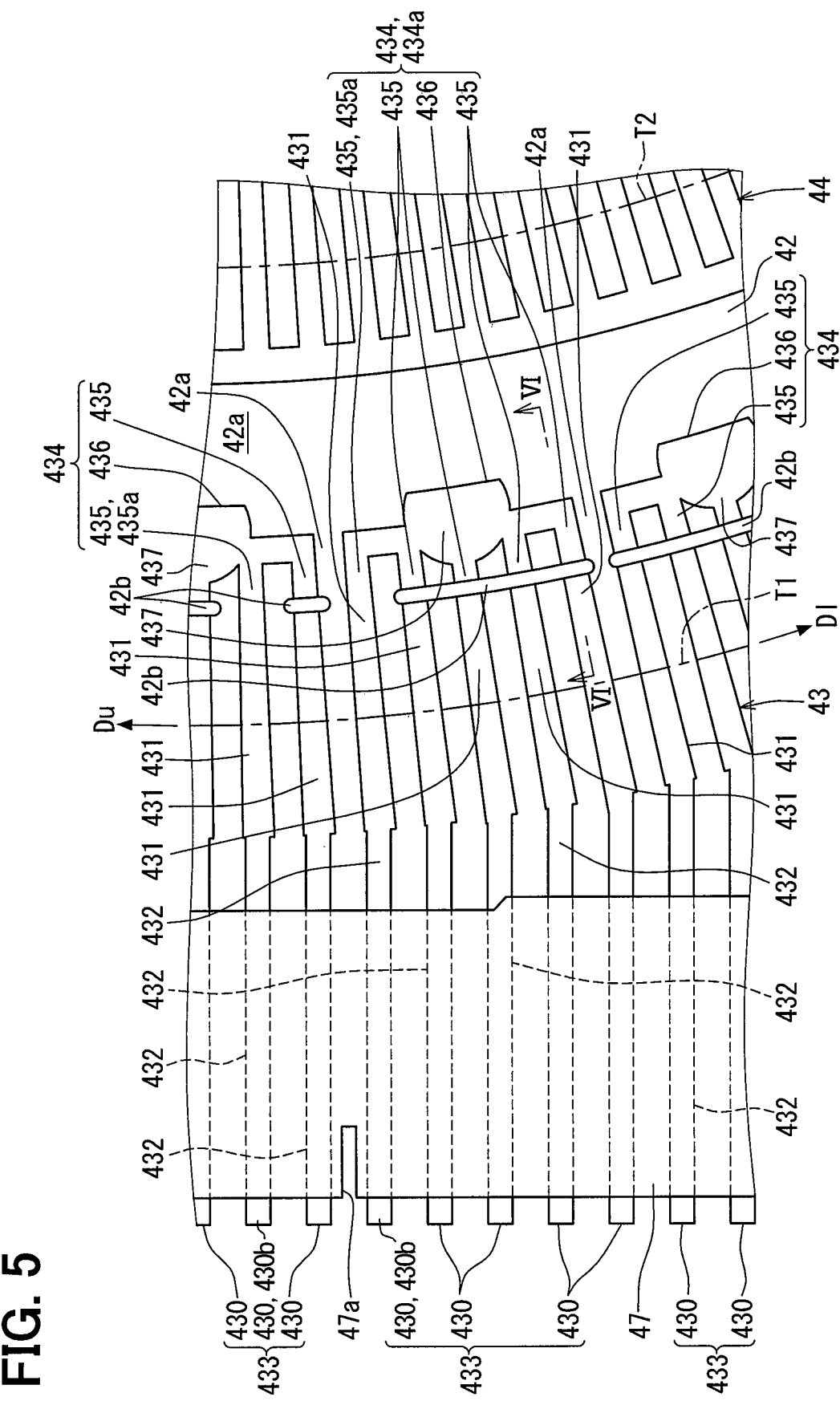
FIG. 5 is an enlarged front schematic view of a portion of FIG. 3.

The first fixed electrode 43 is separated into multiple segment electrodes 430 in a first electrode region R1 allocated to a part of the mounting surface 42a. As shown in FIGS. 2 and 5, each segment electrode 430 integrally includes a sliding contact electrode portion 431 and a superimposing electrode portion 432. The sliding contact electrode portion 431 of each segment electrode 430 is formed across the first trajectory T1 from a radially outer side toward a radially inner side. The sliding contact electrode portion 431 of each segment electrode 430 extends in a narrow linear band shape along a different radial direction from an arbitrary radial direction of the first trajectory T1. The sliding contact electrode portions 431 of each of the segment electrodes 430 are arrayed at a substantially constant pitch in the movement directions Dl and Du. With such a configuration, in the first fixed electrode 43, the first sliding contact 411 can be slid on the first trajectory T1 to the sliding contact electrode portion 431 of one of the segment electrodes 430 in accordance with the movement of the movable body 30 within the limited angle range.

The superimposing electrode portion 432 of each segment electrode 430 is formed continuously from the corresponding sliding contact electrode portion 431 in the radially outer side of the first trajectory T1. However, in the segment electrodes 430 respectively provided at both side movement ends of the movement directions Dl and Du, one common superimposing electrode portion 432 is formed continuously from the multiple sliding contact electrode portions 431. The superimposing electrode portion 432 of each segment electrode 430 extends in a narrow linear band shape along a lateral direction substantially perpendicular to the vertical direction. The superimposing electrode portions 432 of each of the segment electrodes 430 are arrayed at a variable pitch corresponding to the formed portions in the vertical direction.

As shown in FIG. 2, the second fixed electrode 44 integrally includes multiple segment electrode portions 440 and connection electrode portions 441 in a second electrode region R2 allocated to a portion of the mounting surface 42a outside the first electrode region R1. Each of the segment electrode portions 440 is formed across the second trajectory T2 from the radially outer side to the radially inner side. Each of the segment electrode portions 440 extends in a narrow linear band shape along a different radial direction from each other in an arbitrary radial direction of the second trajectory T2. The segment electrode portions 440 are arrayed at a substantially constant pitch in the movement directions Dl and Du. In this example, the pitch between the adjacent segment electrode portions 440 is set in advance to a value larger than the pitch between the adjacent sliding contact electrode portions 431 described above. With such a configuration, in the second fixed electrode 44, the second sliding contact 412 can be slid into contact with any of the segment electrode portions 440 on the second trajectory T2 in accordance with the movement of the movable body 30 within the limited angle range.

The connection electrode portion 441 is formed continuously from all the segment electrode portions 440 in the radially outer side of the second trajectory T2 and the radially inner side of the first fixed electrode 43. The connection electrode portion 441 extends in a narrow arc band shape along the movement directions Dl and Du. The connection electrode portions 441 configured as described above are electrically connected to the segment electrode portions 440 by extending between the radially outer side end portions of the segment electrode portions 440.

The first output electrode 45 is formed on a portion of the mounting surface 42a above the first fixed electrode 43 in the first electrode region R1 and deviated from the respective trajectories T1 and T2. The first output electrode 45 is electrically connected to the first fixed electrode 43 through the resistive element 47, which will be described later in detail. The second output electrode 46 is formed on a portion of the mounting surface 42a above the second fixed electrode 44 in the second electrode region R2 and deviated from the respective trajectories T1 and T2. The second output electrode 46 is formed continuously from the segment electrode portion 440a located at an uppermost portion of the second fixed electrode 44 so as to be electrically connected to the second fixed electrode 44.

With the above configuration, in the variable resistance unit 40, the electric output from the first and second output electrodes 45 and 46 is provided in accordance with the electrical resistance between the first output electrode 45 and the first sliding contact 411 and the electrical resistance between the first sliding contact 411 and the second output electrode 46 through the second sliding contact 412. In this example, in particular, since an electrical resistance between the first output electrode 45 and the first sliding contact 411 becomes an electrical resistance through the segment electrode 430 in sliding contact with the first contact 411 and the resistive element 47 to be described later in detail, the electrical resistance changes greatly with the movement of the movable body 30. As a result, the electric outputs from the first and second output electrodes 45 and 46 accurately represent the liquid level L shown in FIG. 1 with high resolution.

As shown in FIGS. 2 and 5, the resistive element 47 is made of a high resistance metal material such as ruthenium oxide. The resistive element 47 is formed to have a substantially uniform thickness thinner than that of the circuit board 42 by printing a paste of such a high-resistance metal material on the mounting surface 42a and then baking the paste. With print formation on the mounting surface 42a described above, the resistive element 47 is provided in the same thin film shape as that of the fixed electrodes 43 and 44 and the output electrodes 45, 46, and has a higher electrical resistance than that of the electrodes 43 to 46.

The resistive element 47 is provided on the mounting surface 42a so as to overlap with the first fixed electrode 43 and the first output electrode 45 in a state of covering the first output electrode 45 from the first fixed electrode 43 in the first electrode region R1. The resistive element 47 extends to the radially outer side of the first trajectory T1 in a wide arc band shape along the movement directions Dl and Du. As a result, the resistive element 47 extends between the superimposing electrode portions 432 of the segment electrodes 430 in the first fixed electrode 43 so as to be electrically connected to the segment electrodes 430. Further, as shown in FIG. 2, the resistive element 47 extends between the superimposing electrode portion 432 of the segment electrode 430a located at the uppermost portion of the first fixed electrode 43 and the first output electrode 45, thereby being electrically connected to the electrodes 430a and 45.

As shown in FIGS. 2 and 5, in the resistive element 47, a necessary portion 47a between the segment electrodes 430 is partially cut at a portion in the band width direction. As a result, the electrical resistance between the first output electrode 45 and the first sliding contact 411 is determined.

The first and second terminals 48 and 49 shown in FIG. 1 are made of a conductive metal material such as phosphor bronze. The first and second terminals 48 and 49 are electrically connected to the first and second output electrode 45 and 46, respectively. The terminals 48 and 49 are electrically connected to an external circuit outside the fuel tank 2 in the vehicle, thereby supplying electric outputs from the first and second output electrodes 45 and 46 to the external circuit. As a result, the external circuit can acquire the value of the liquid level L detected on the basis of the electric outputs from the first and second output electrodes 45 and 46.

The adjustment electrode will be described. The detailed configuration specific to the first fixed electrode 43 will be described.

Figure 3:
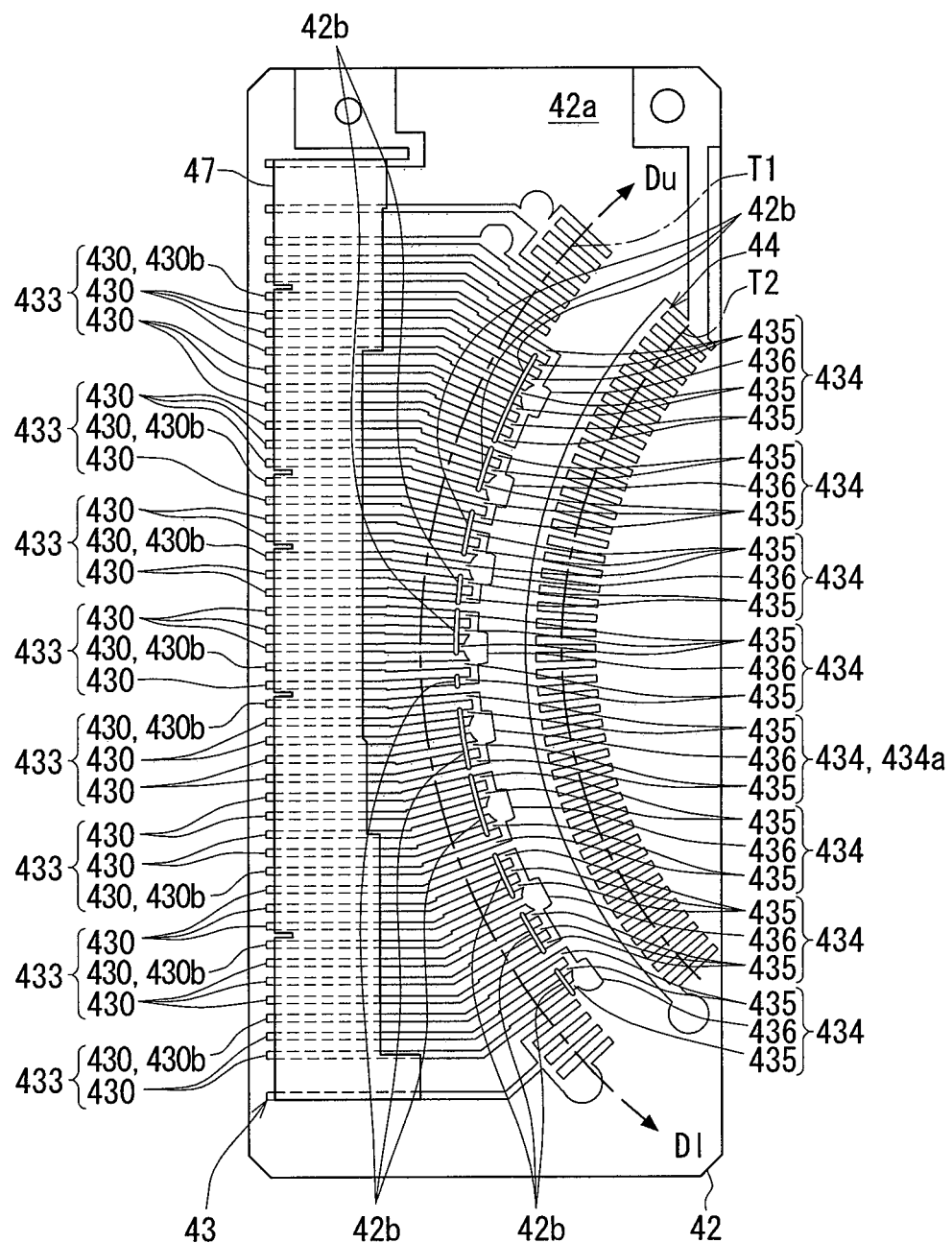
FIG. 3 is a front schematic view showing one configuration of a variable resistance unit according to the first embodiment.
Figure 4:
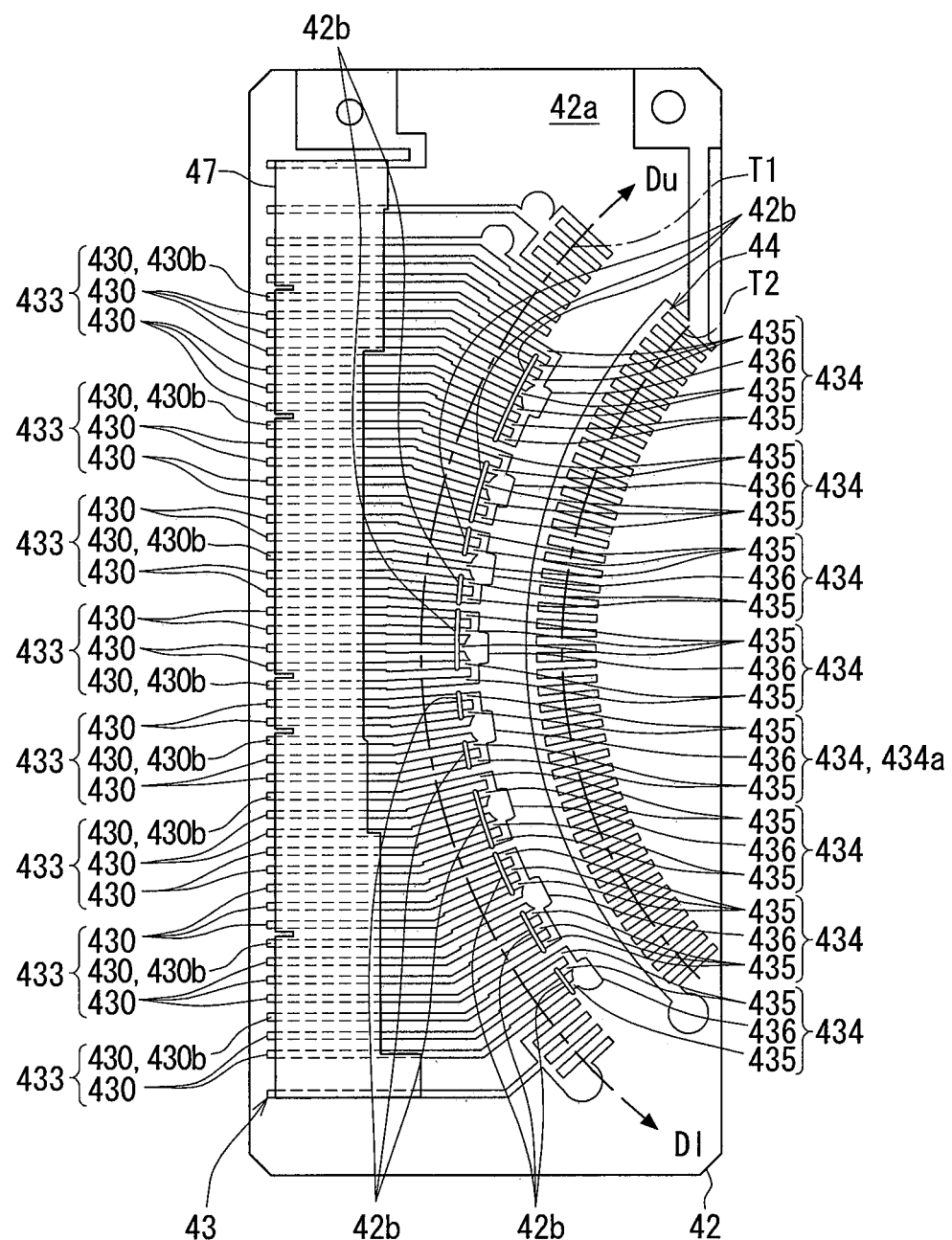
FIG. 4 is a front schematic view showing another configuration of the variable resistance unit according to the first embodiment.

As shown in FIG. 3, multiple electrode groups 433 are defined in the first fixed electrode 43 along the movement directions Dl and Du. In each electrode group 433, the segment electrodes 430 aligned in the movement directions Dl and Du are classified by at least two or more predetermined numbers corresponding to the upper and lower set portions. As shown in FIGS. 2 and 3, in each of the electrode groups 433, one specific electrode 430 of the predetermined number of segment electrodes 430 is selected in advance as a specific electrode 430b. In this case, the segment electrode 430 selected as the specific electrode 430b for each electrode group 433 can be changed according to the product specification as shown in FIGS. 3 and 4.

As shown in FIG. 2, multiple adjustment electrodes 434 are added to the first fixed electrode 43. Each adjustment electrode 434 as a part of the first fixed electrode 43 is formed by printing on the mounting surface 42a in the form of a thin film having substantially the same thickness as the second fixed electrodes 43 and 44 and the output electrodes 45 and 46. Each adjustment electrode 434 integrally includes multiple segment electrode portions 435 and connection electrode portions 436 as shown in FIG. 3 in a third electrode region R3 allocated to a portion of the mounting surface 42a between the first and second electrode regions R1 and R2. In this example, the third electrode region R3 is located on the mounting surface 42a on the opposite side of the resistive element 47 across the first trajectory T1.

As shown in FIGS. 3 and 5, the adjustment electrodes 434 are provided so as to correspond to the different electrode groups 433 one by one. As a result, the mounting surface 42a continuously spreads between the connection electrode portions 436 of the adjustment electrodes 434 aligned in the movement directions Dl and Du by corresponding to the electrode groups 433, without forming cut marks 42b, which will be described later in detail.

The adjustment electrodes 434 have substantially the same configuration as each other except for the number of segment electrode portions 435, which will be described later in detail. Therefore, in the following, a configuration of an adjustment electrode 434a shown in an enlarged manner in FIGS. 5 and 6 will be described as a representative, and the description of the configuration of the other adjustment electrodes 434 will be omitted.

As shown in FIGS. 3 and 5, the adjustment electrode 434a forms, in the radially inner side of the first trajectory T1, the segment electrode portions 435 having the same number as that of the segment electrodes 430 forming the corresponding electrode group 433. Each segment electrode portion 435 extends in a narrow linear band shape along a different radial direction from each other in an arbitrary radial direction of the first trajectory T1. As a result, the segment electrode portions 435 are arrayed at substantially constant pitches in the movement directions Dl and Du. In this example, the pitch between the adjacent segment electrode portions 435 is set in advance to be substantially the same value as the pitch of the sliding contact electrode portions 431 described above.

Figure 6:
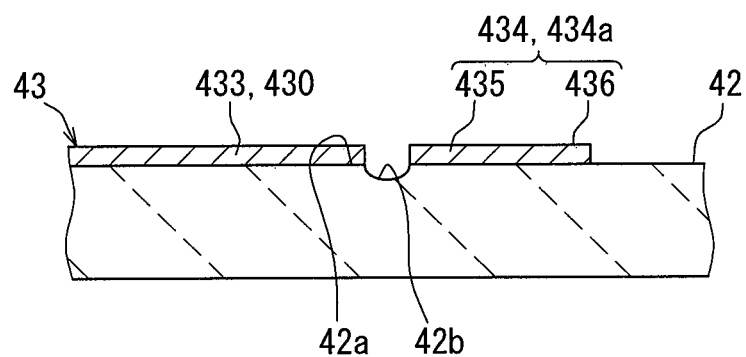
FIG. 6 is a schematic cross-sectional view taken along a line VI-VI of FIG. 5.
Figure 7:
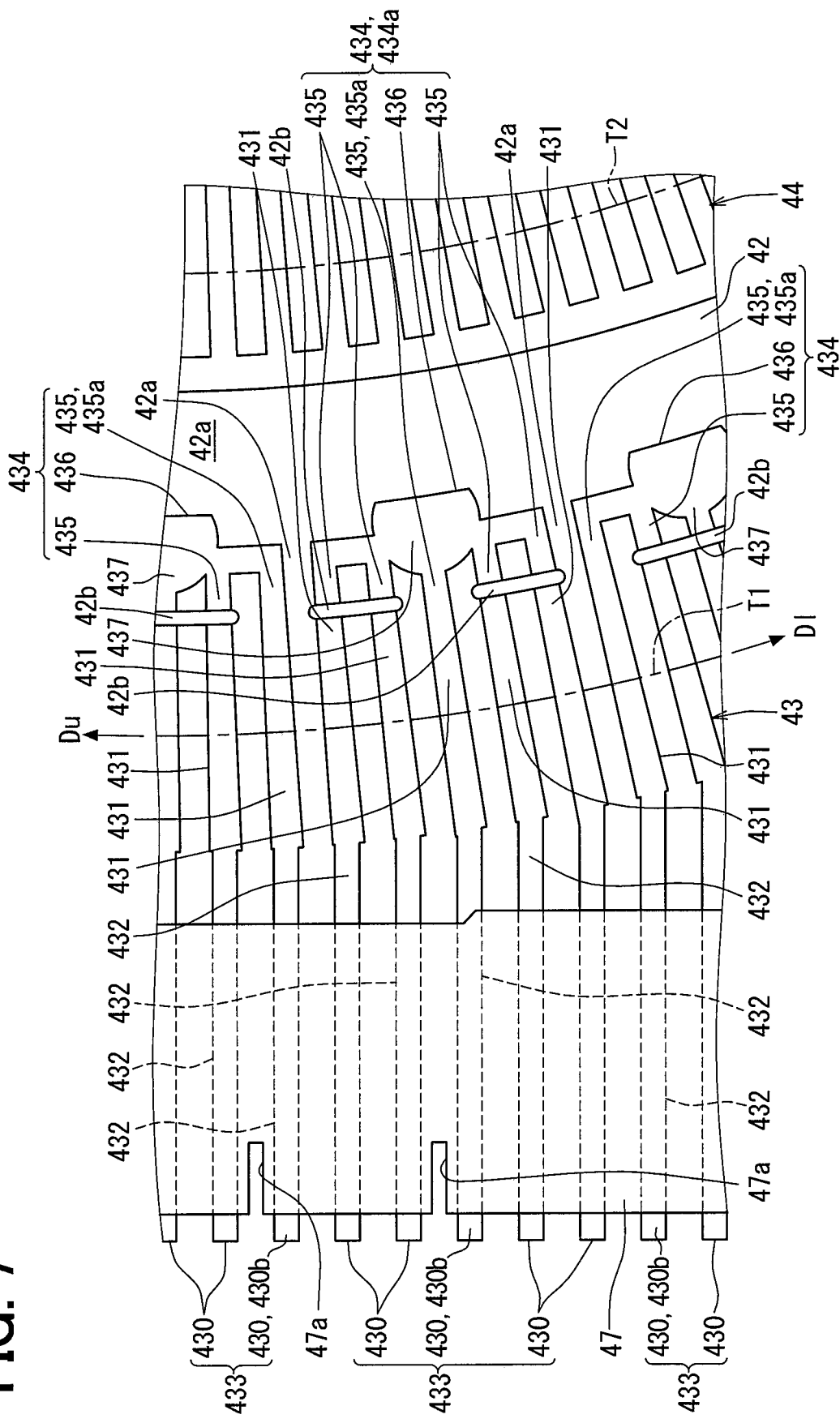
FIG. 7 is an enlarged front schematic view of a part of FIG. 4.

As shown in FIG. 5, one specific segment electrode portion 435a in the adjustment electrode 434a is formed continuously from the specific electrode 430b in the corresponding electrode group 433 on the radially outer side so as to be electrically connected to the specific electrode 430b. On the other hand, at least two segment electrode portions 435 other than the specific segment electrode portion 435a in the adjustment electrode 434a are completely cut over the entire area in the band width direction from the segment electrodes 430 other than the specific electrode 430b in the corresponding electrode group 433 in the radially outer side. As a result, the circuit board 42 has the cut marks 42b recessed from the mounting surface 42a as shown in FIGS. 3, 5, and 6 between the segment electrode portions 435 other than the segment electrode portions 435a of the adjustment electrodes 434a and the segment electrodes 430 other than the specific electrode 430b of the corresponding electrode group 433. This relies on laser trimming, as described in more detail below, to achieve a complete cut and inevitably leave the cut marks 42b. In this case, the cutting portion between the segment electrode portion 435 and the segment electrode 430, that is, the forming portion of the cut mark 42b, can be changed as shown in FIGS. 5 and 7 in accordance with the selection of the specific electrode 430b complying to the product specification shown in FIGS. 3 and 4.

In the adjustment electrode 434a shown in FIGS. 3, 5, and 6, the connection electrode portion 436 is formed continuously from all the segment electrode portions 435 forming the same adjustment electrode 434a in the radially inner side of the first trajectory T1 and the radially outer side of the second fixed electrode 44. The connection electrode portion 436 extends in a narrow arc band shape along the movement directions Dl and Du. However, the width of the connection electrode portion 436 is enlarged at an intermediate portion in the movement directions Dl and Du to form an adjustment pad 437 as shown in FIG. 5. The connection electrode portions 436 having such a configuration are electrically connected to the segment electrode portions 435 by extending between the radially inner side end portions of the segment electrode portions 435.

In the adjustment electrode 434a as described above, the electrical resistance through the specific segment electrode portion 435a, the specific electrode 430b, and the resistive element 47 is adjusted in advance between the adjustment pad 437 and the first output electrode 45 in the connection electrode portion 436, as will be described later in detail. In this example, it is hypothesized that the electrical resistance between the adjustment pad 437 and the first sliding contact 411 in sliding contact with the specific electrode 430b through the specific segment electrode portion 435a and the specific electrode 430b is substantially the same as a design value. This is based on the fact that the electrical resistance of the adjustment electrode 434a and the specific electrode 430b is sufficiently low compared to the electrical resistance of the resistive element 47, so that an error caused by a manufacturing tolerance can be ignored. Therefore, with the previous adjustment of the electrical resistance between the adjustment pad 437 and the first output electrode 45, it is possible to accurately determine the electrical resistance between the first sliding contact 411 and the first output electrode 45 through the specific electrode 430b and the resistive element 47.

Next, a manufacturing method for manufacturing the liquid level detecting device 1 will be described in detail.

Figure 8:
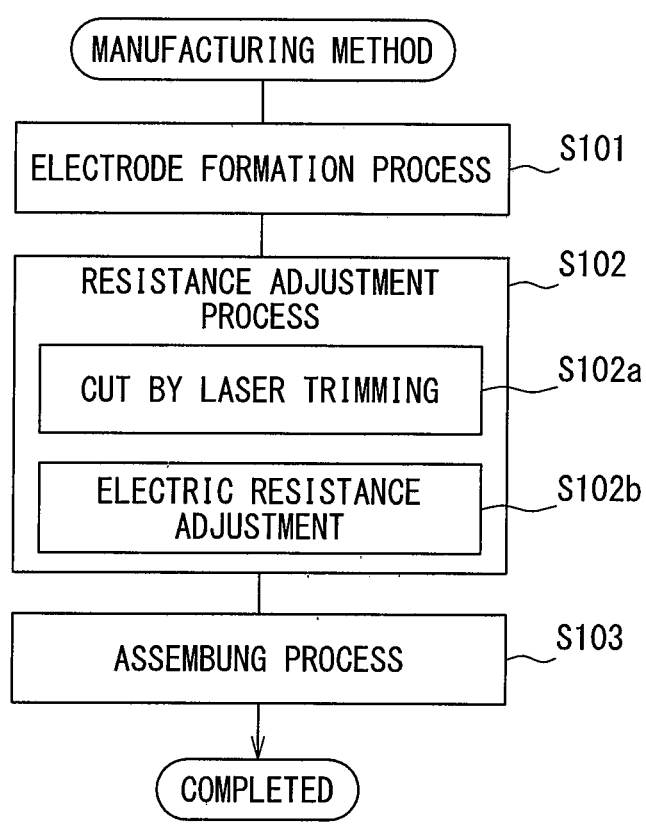
FIG. 8 is a flowchart showing a method of manufacturing the liquid level detecting device according to the first embodiment.
Figure 9:
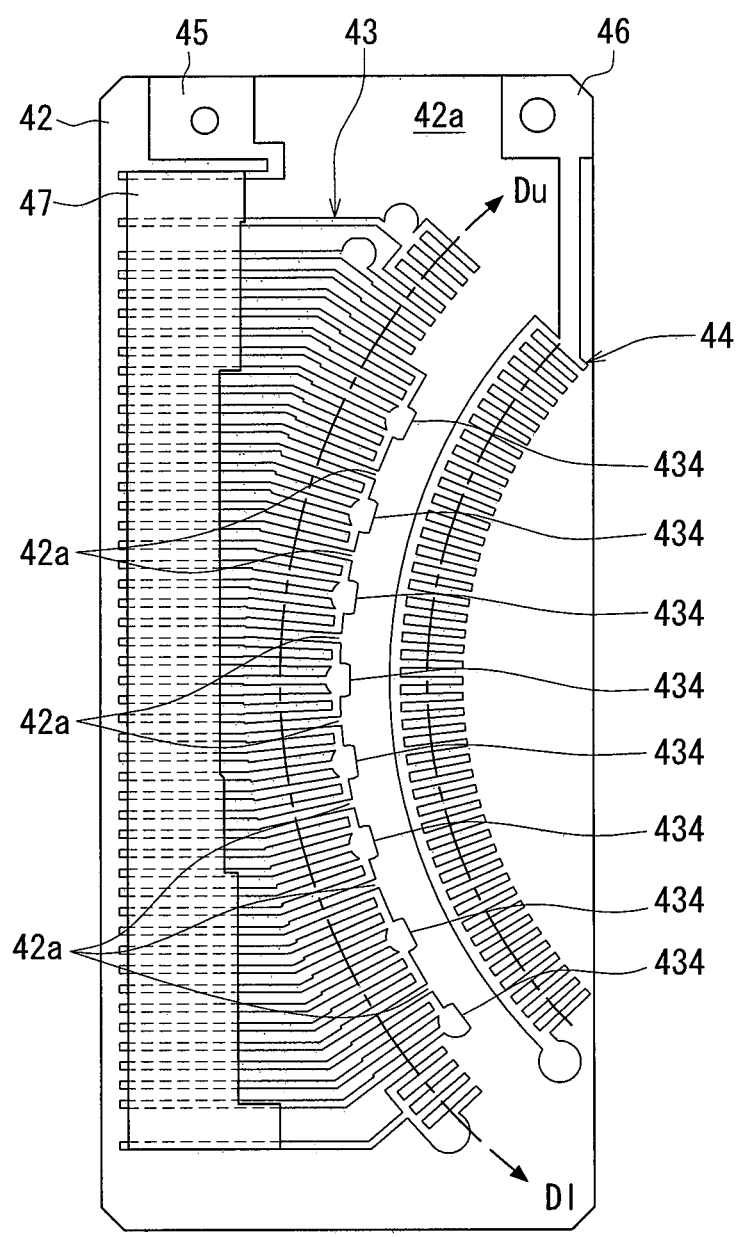
FIG. 9 is a front schematic view showing the method of manufacturing the liquid level detecting device according to the first embodiment.

In S101 of the manufacturing method shown in FIG. 8, an electrode forming step is performed. In this S101, the fixed electrodes 43 and 44 including the multiple adjustment electrodes 434 are printed together with the output electrodes 45 and 46 on the mounting surface 42a of the circuit board 42 as shown in FIG. 9, and the resistive element 47 is also printed on those electrodes. In this example, the print formation in S101 means printing the paste of the conductive metal material on the mounting surface 42a and then baking the paste as described above. In the print formation of S101, except for some electrode groups 433 on both sides of the movement directions Dl and Du, all the segment electrodes 430 classified into the electrode groups 433 are formed in electrical connection with the respective adjustment electrodes 434. Further, in the print formation of S101, the continuous mounting surface 42a is left between the adjacent adjustment electrodes 434 aligned in the movement directions Dl and Du among the adjustment electrodes 434 corresponding to each of the electrode groups 433.

Next, in S102 of the manufacturing method shown in FIG. 8, a resistance adjustment step is performed. In S102, the electrical resistance is adjusted between the adjustment pad 437 of the adjustment electrode 434 corresponding to each electrode group 433 and the first output electrode 45.

Figure 10:
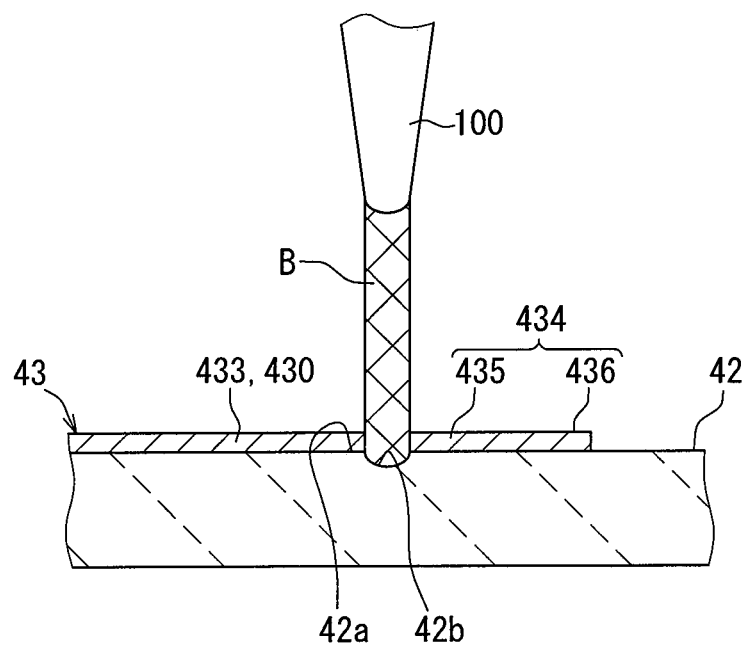
FIG. 10 is a schematic cross-sectional view illustrating the method of manufacturing the liquid level detecting device according to the first embodiment.

Specifically, in S102, first, in the cutting process in S102a, portions between the segment electrodes 430 other than the specific electrode 430b in each electrode group 433 and the respective adjustment electrodes 434 are completely cut across the entire area of the electrodes in the band width direction. In this example, the cutting process of S102a means so-called laser trimming in which an electrode material corresponding to a beam width of a laser beam B is removed by irradiation with the laser beam B from a laser processing device 100 shown in FIG. 10. Further, an irradiation portion irradiated with the laser beam B in the cutting process of S102a is electrical connection portions between at least two segment electrodes 430 other than the specific electrode 430b in each electrode group 433 and the segment electrode portions 435 of the adjustment electrodes 434 corresponding to the respective segment electrodes 430. As a result of the above cutting process, the circuit board material is partially removed by the irradiation of the laser beam B between the segment electrodes 430 other than the specific electrode 430b and the respective segment electrode portions 435, so that the cut mark 42b in a concave state recessed from the mounting surface 42a is provided in the substrate 42. This is because, in order to remove all of the electrode material on the mounting surface 42a in the thickness direction, the substrate material is inevitably partially removed by causing the laser beam B to reach the mounting surface 42a.

Figure 11:
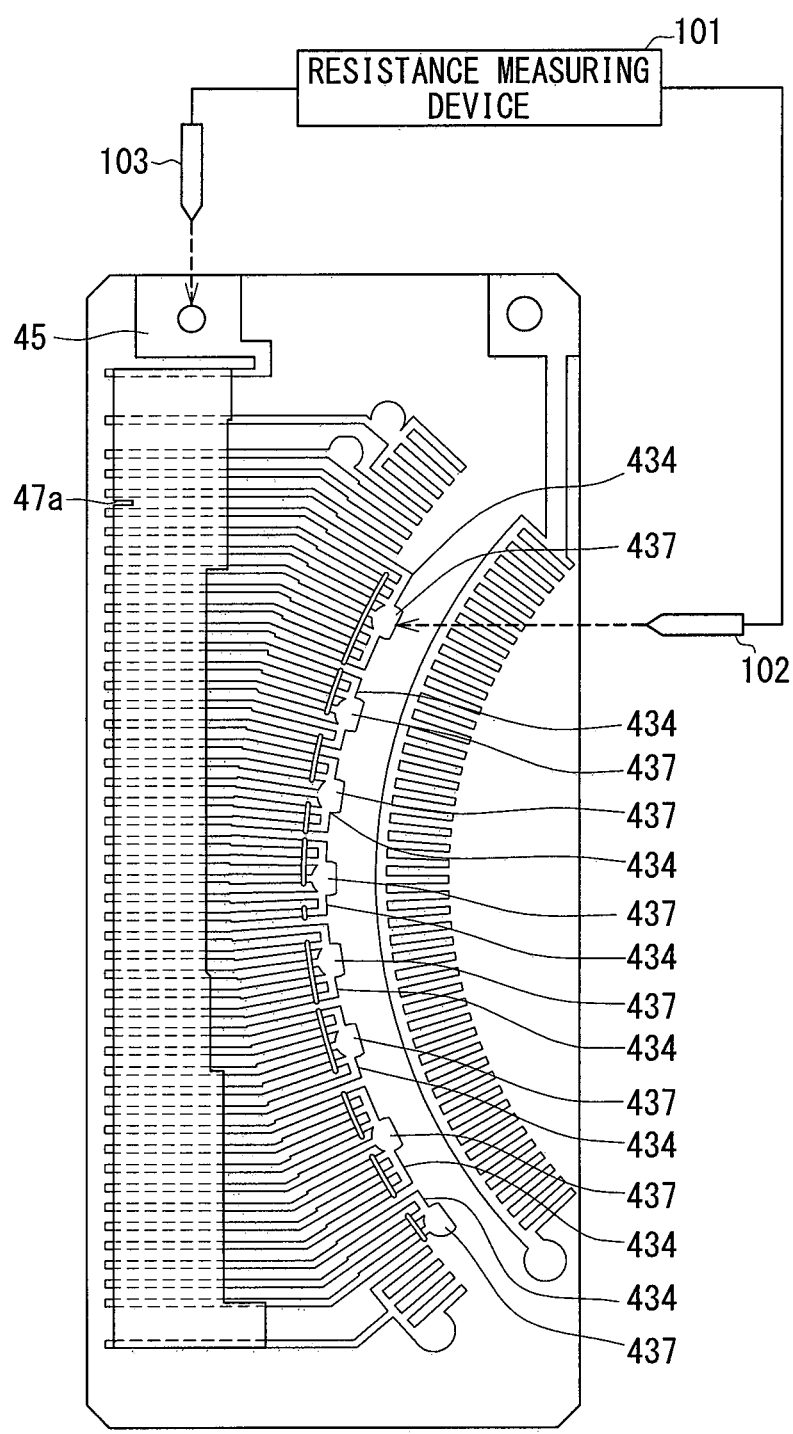
FIG. 11 is a front schematic view showing the method of manufacturing the liquid level detecting device according to the first embodiment.

In S102 shown in FIG. 8, in subsequent S102b, measurement probes 102 and 103 of the resistance measurement device 101 shown in FIG. 11 are pressed against the adjustment pad 437 of the adjustment electrode 434 and the first output electrode 45, respectively. Further, in S102b, the electrical resistance measured by the resistance measurement device 101 between the measurement probes 102 and 103, that is, between the adjustment pad 437 of the adjustment electrode 434 and the first output electrode 45 is adjusted. In this example, in the adjustment of S102b, when the measured electrical resistance is deviated from the design value by an allowable error range or more, the necessary portion 47a of the resistive element 47 is partially cut at a portion in the band width direction, to thereby change the electrical resistance between the adjustment pad 437 and the first output electrode 45 in accordance with the design value. At that time, the resistive element 47 is partially cut by the laser trimming in accordance with S102a, so that the cut mark recessed from the mounting surface 42a is provided in the circuit board 42 even in the partially cut portion 47a, although not shown. As described above, the electrical resistance between each of the adjustment electrodes 434 and the first output electrode 45 is adjusted in advance by execution of the above S102b between the adjustment pads 437 of all of the adjustment electrodes 434 and the first output electrode 45.

In the manufacturing method shown in FIG. 8, upon the completion of S102, an assembling step is executed in S103. In S103, after the circuit board 42 whose electrical resistance has been adjusted as described above is mounted on the body 10, and the movable electrode 41 and the float 20 are mounted on the movable body 30, the movable body 30 is pivotably supported on the body 10. As a result, the variable resistance unit 40 and the liquid level detecting device 1 including the variable resistance unit 40 are assembled together, and the manufacturing of the device 1 is completed.

The operation and effect of the first embodiment described above will be described below.

According to the liquid level detecting device 1 of the first embodiment, the electrical resistance between the first output electrode 45 and each adjustment electrode 434 electrically connected corresponding to one specific electrode 430b among the segment electrodes 430 in each electrode group 433 is adjusted in advance. Therefore, the electrical resistance between the first sliding contact 411 and the first output electrode 45 in sliding contact with each other can be accurately determined for each specific electrode 430b electrically connected to the corresponding adjustment electrode 434 in each electrode group 433. Further, in each electrode group 433 in which the segment electrodes 430 aligned in the movement directions Dl and Du are classified by a predetermined number, the electrical resistance between the first sliding contact 411 and the first output electrode 45, which are in sliding contact with each other, can be accurately determined according to the array pitch even for the segment electrodes 430 other than the specific electrode 430b with reference to the specific electrode 430b. As described above, in order to determine the electrical resistance of each segment electrode 430, the electrical resistance of each adjustment electrode 434 which is smaller than the total number of the segment electrodes 430 may be adjusted, so that the productivity can be increased.

In addition, according to the liquid level detecting device 1 of the first embodiment, the cut mark 42b recessed from the mounting surface 42a of the circuit board 42 is confirmed between the segment electrodes 430 other than the specific electrode 430b in each electrode group 433 and the respective adjustment electrodes 434. In this example, in a state in which all the segment electrodes 430 of each electrode group 433 are electrically connected to the respective adjustment electrodes 434, the cutting process is performed between the segment electrodes 430 other than the specific electrode 430b in each electrode group 433 and the respective adjustment electrodes 434, thereby being capable of providing the cut mark 42b. From the above fact, if the cutting portions between all the segment electrodes 430 in each electrode group 433 and the respective adjustment electrodes 434 are changed in accordance with the product specification, the electrical resistance of each segment electrode 430 can be determined as described above, thereby being capable of contributing to realization of high productivity.

According to the liquid level detecting device 1 of the first embodiment, the adjustment electrodes 434 corresponding to the segment electrodes 430 other than the specific electrode 430b in each electrode group 433 through the cut mark 42b are provided in the region R3 opposite to the resistive element 47 across the trajectory T1 of the first sliding contact 411. According to the above configuration, even if a relative position between the first sliding contact 411 and the cut mark 42b deviates due to, for example, a manufacturing tolerance, vibration, or the like, the cut mark 42b is less likely to reach the trajectory T1 of the first sliding contact 411. Therefore, a situation in which the sliding contact between the segment electrodes 430 other than the specific electrode 430b in each electrode group 433 and the first sliding contact 411 is hindered by the cut mark 42b due to such a positional deviation can be avoided, and therefore, the productivity can be enhanced without lowering the product quality.

Further, according to the liquid level detecting device 1 of the first embodiment, a continuous mounting surface 42a is confirmed between the adjacent adjustment electrodes 434 aligned in the movement directions Dl and Du of the adjustment electrodes 434 formed by printing corresponding to the respective electrode groups 433. In this example, regardless of the cutting process between the adjustment electrodes 434 corresponding to each electrode group 433 and the segment electrodes 430 other than the specific electrode 430b, portions between those electrodes are not subjected to the cutting process. As a result, the continuous mounting surface 42a may be left between those electrodes. According to the above configuration, the number of portions to be subjected to the cutting process can be reduced as much as possible and the productivity can be enhanced.

In addition, according to the manufacturing method of the first embodiment, after all the segment electrodes 430 of each electrode group 433 and the respective adjustment electrodes 434 are formed in an electrical connection state, the portions between the segment electrodes 430 other than the specific electrode 430b in each electrode group 433 and the respective adjustment electrodes 434 are cut so as to define the cut mark 42b. According to the above configuration, if the cutting portions between all the segment electrodes 430 of each electrode group 433 and the respective adjustment electrodes 434 are changed in accordance with the product specification, the electrical resistance of each segment electrode 430 can be determined as described above, which contributes to the realization of high productivity.

Further, according to the method of manufacturing the first embodiment, the adjustment electrodes 434 corresponding to each electrode group 433 are formed so as to leave the continuous mounting surface 42a between the adjacent adjustment electrodes 434 aligned in the movement directions Dl and Du, regardless of the cutting process between the adjustment electrodes 434 and the segment electrodes 430 other than the specific electrode 430b. According to the above configuration, the number of portions to be subjected to the cutting process can be reduced as much as possible and the productivity can be enhanced.

Second Embodiment

A second embodiment is a modification of the first embodiment.

Figure 12:
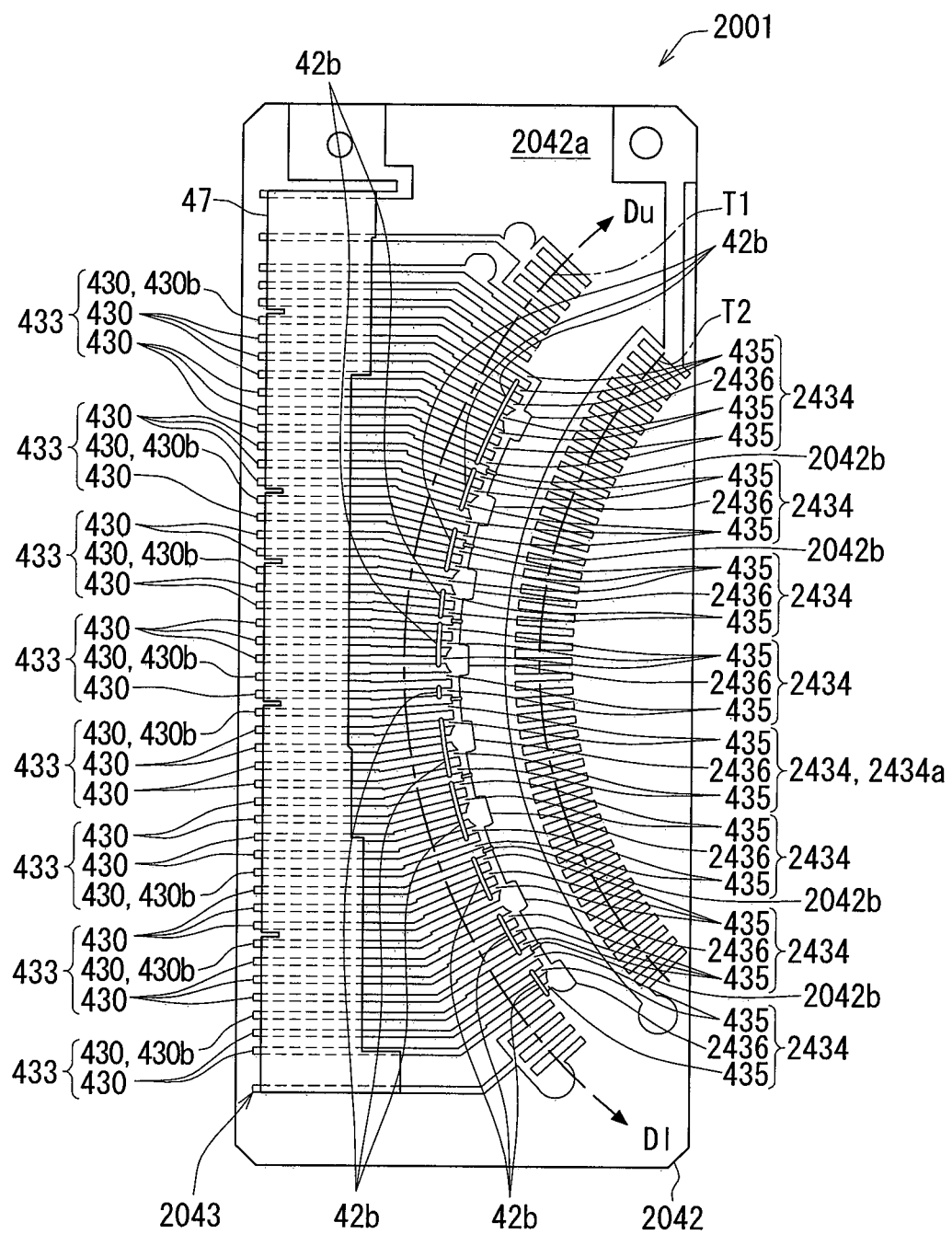
FIG. 12 is a front schematic view showing a configuration of a variable resistance unit according to a second embodiment.
Figure 13:
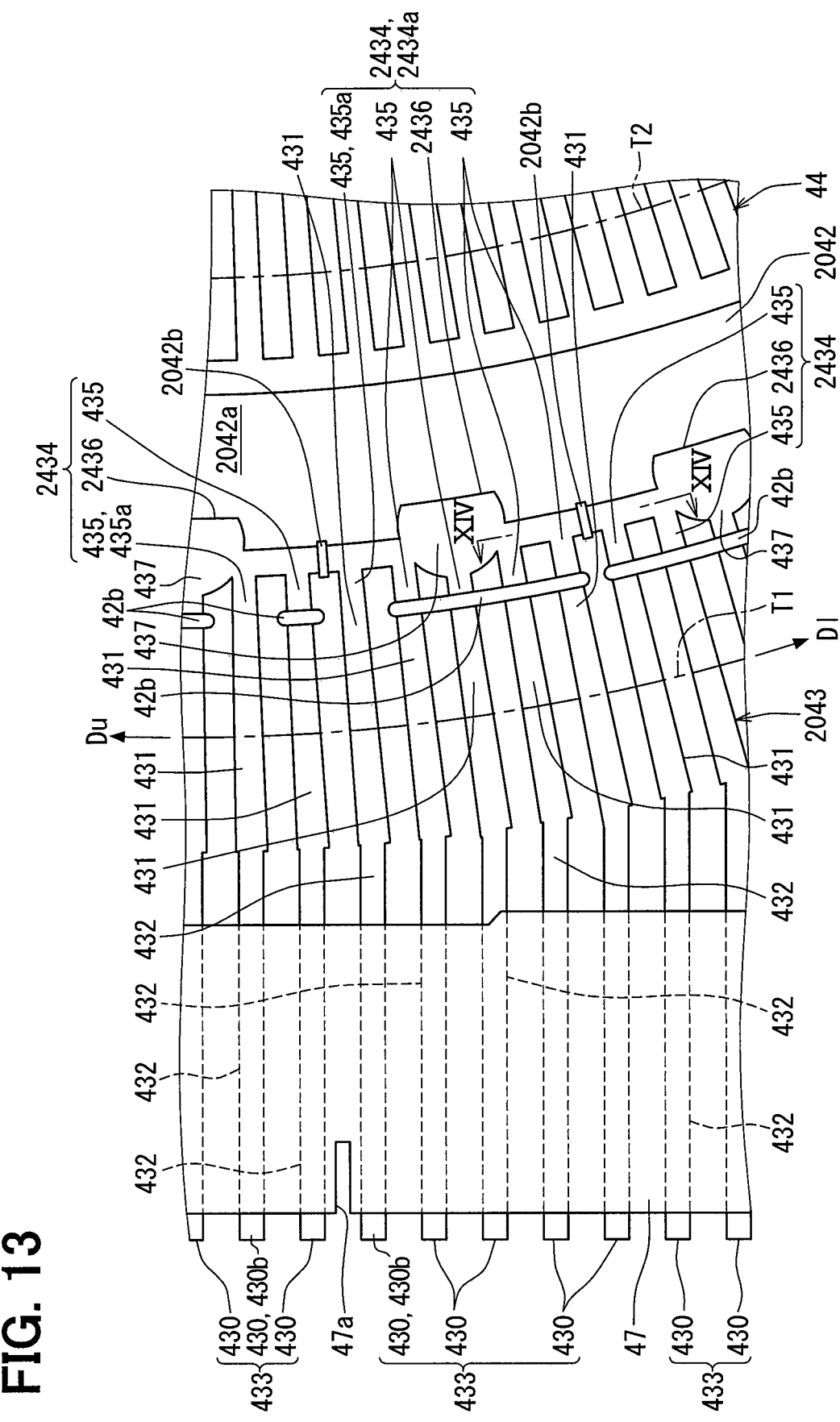
FIG. 13 is an enlarged front schematic view of a part of FIG. 12.
Figure 14:
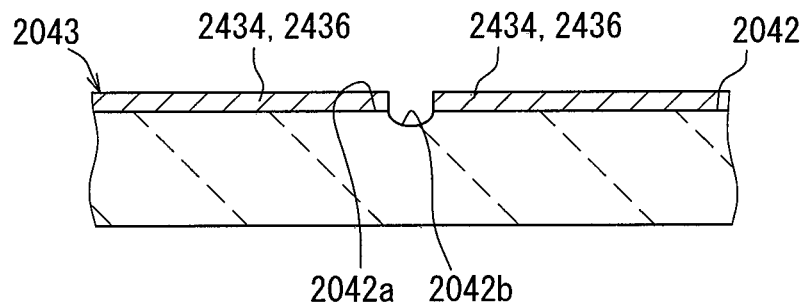
FIG. 14 is a schematic cross-sectional view taken along a line XIV-XIV in FIG. 13.

As shown in FIGS. 12 and 13, in a liquid level detecting device 2001 according to the second embodiment, in first fixed electrodes 2043 printed on a mounting surface 2042a of a circuit board 2042, the mounting surface 2042a is not continuous up to portions between multiple adjacent adjustment electrodes 2434. Specifically, adjacent connection electrode portions 2436 of the adjustment electrodes 2434 aligned in movement directions Dl and Du corresponding to respective electrode groups 433 are completely cut across an entire area in a band width direction. As a result, the circuit board 2042 has cut marks 2042b recessed from the mounting surface 2042a as shown in FIGS. 12 to 14, between the adjacent connection electrode portions 2436 of the respective adjustment electrodes 2434. This is also based on the fact that complete cutting is realized by the same laser trimming as in the first embodiment and the cut marks 2042b are inevitably left. FIGS. 13 and 14 are enlarged views of the adjustment electrodes 2434a according to the second embodiment corresponding to the adjustment electrode 434a of the first embodiment. The liquid level detecting device 2001 according to the second embodiment has substantially the same configuration as that of the first embodiment except for the configuration described above.

Figure 15:
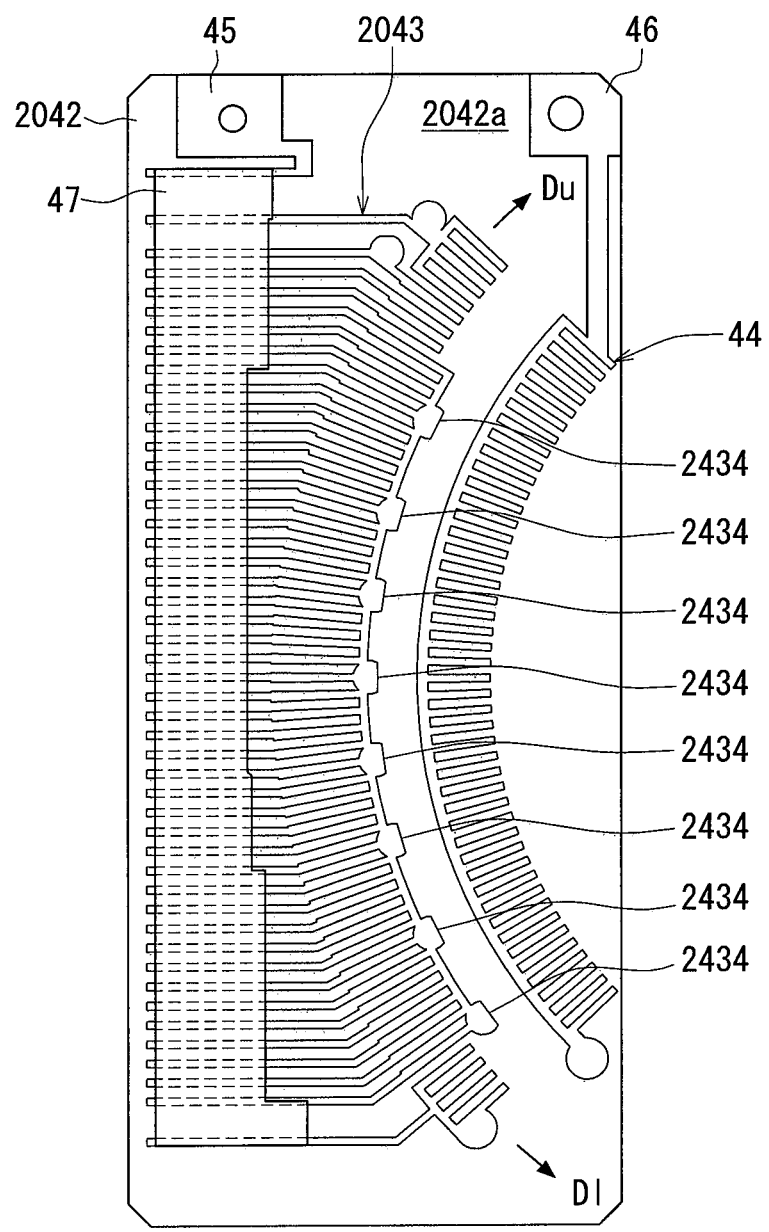
FIG. 15 is a front schematic view showing a method of manufacturing the liquid level detecting device according to the second embodiment.
Figure 16:
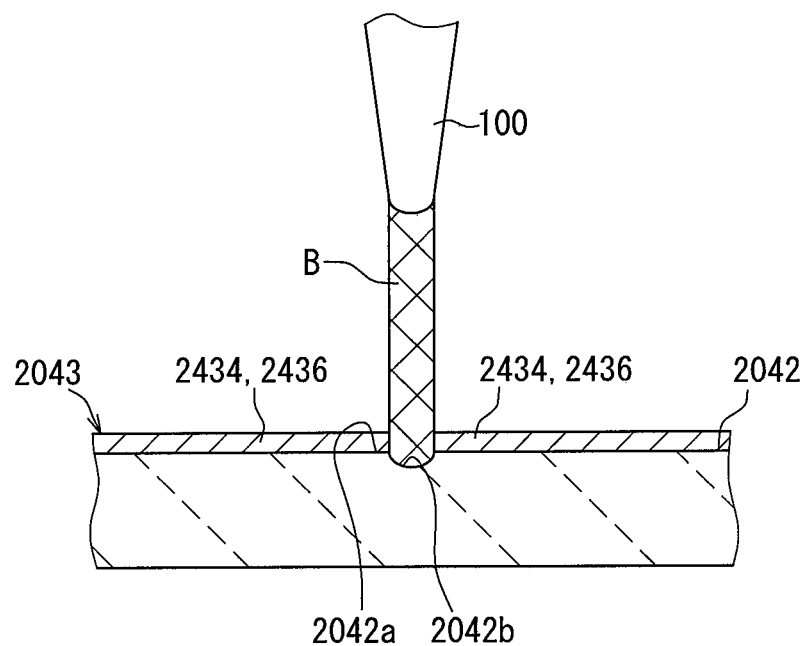
FIG. 16 is a schematic cross-sectional view showing the method of manufacturing the liquid level detecting device according to the second embodiment.

In S101 of the manufacturing method according to the second embodiment described above, the fixed electrodes 2043 and 44 including the multiple adjustment electrodes 2434 are formed by printing, as shown in FIG. 15, so that the respective adjacent adjustment electrodes 2434 aligned in the movement directions Dl and Du are provided in an electrical connection state. Further, in S102a of S102 of the manufacturing method according to the second embodiment, in addition to the cutting process of forming the cut mark 42b, the cutting process of forming the cut mark 2042b by completely cutting between the adjacent connection electrode portions 2436 aligned in the movement directions Dl and Du of the adjustment electrodes 2434 as shown in FIG. 16 is also performed. At that time as well, the cut mark 2042b is formed in a concave state recessed from the mounting surface 2042a by the laser trimming similar to that of the first embodiment. The processing contents other than those described above in the manufacturing method of the second embodiment are substantially the same as those of the first embodiment.

According to the liquid level detecting device 2001 of the second embodiment described above, the cut mark 2042b recessed from the mounting surface is also confirmed between the adjacent adjustment electrodes 2434 aligned in the movement directions Dl and Du among the adjustment electrodes 2434 formed by printing corresponding to each electrode group 433. In this example, the cut mark 2042b may be formed by the cutting process between the adjustment electrodes 2434 corresponding to each electrode group 433 in an electrically connected state. According to the above configuration, the adjustment electrodes 2434 corresponding to the respective electrode groups 433 can be printed in the electrical connection state between the respective adjustment electrodes 2434 at once, thereby being capable of enhancing productivity.

In addition, according to the manufacturing method of the second embodiment, after the adjustment electrodes 2434 corresponding to each of the electrode groups 433 are printed in the electrical connection state between the adjustment electrodes aligned in the movement directions Dl and Du, the portions between the adjacent adjustment electrodes 2434 are cut so as to provide the cut mark 2042b. According to the above configuration, the adjustment electrodes 2434 corresponding to the respective electrode groups 433 can be printed in the electrical connection state between the respective adjustment electrodes 2434 at once, thereby being capable of enhancing productivity.

Third Embodiment

A third embodiment is a modification of the second embodiment.

Figure 17:
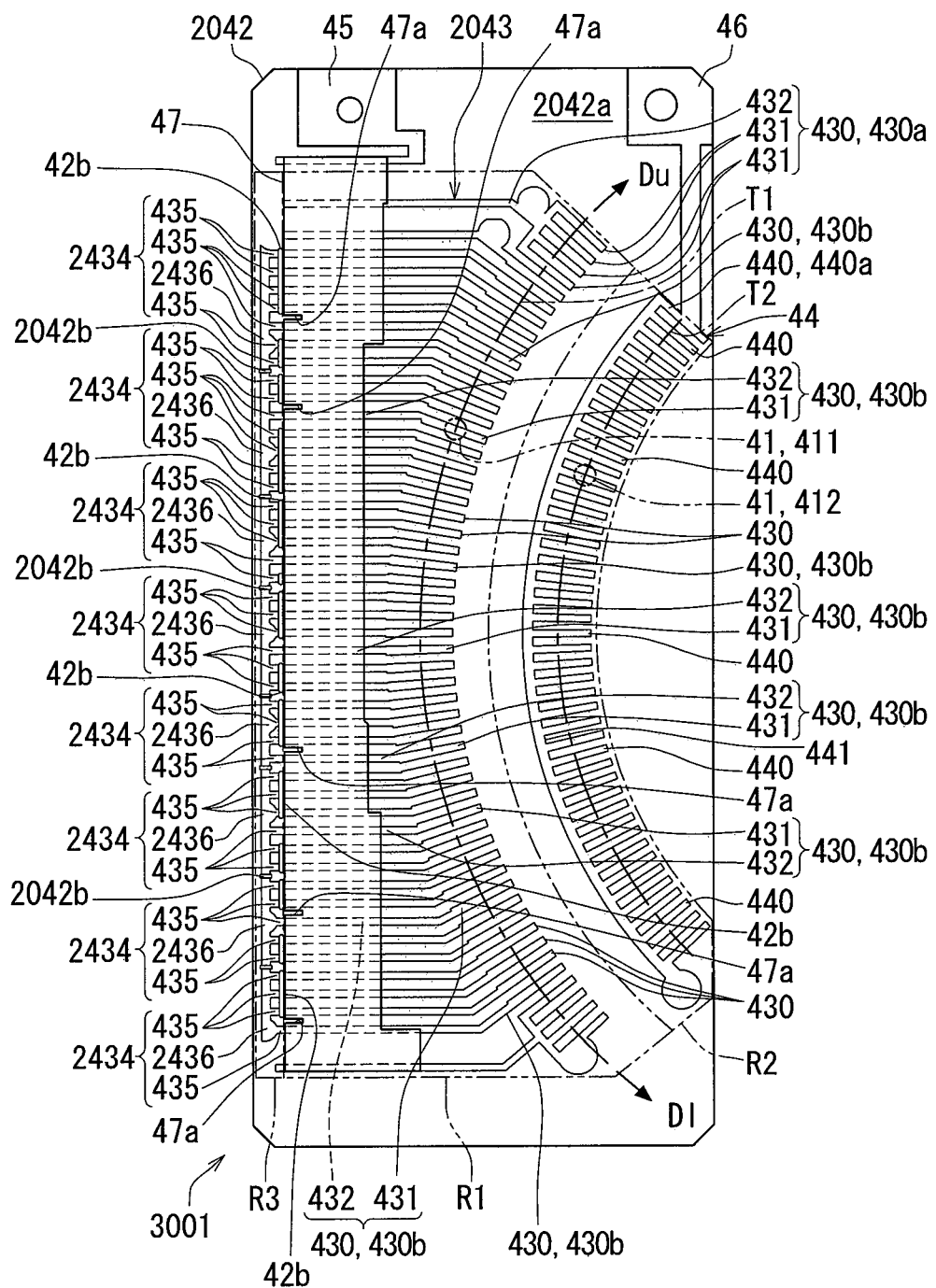
FIG. 17 is a front structural view showing a configuration of a variable resistance unit according to a third embodiment.

As shown in FIG. 17, each adjustment electrode 2434 in a liquid level detecting device 3001 according to the third embodiment integrally includes multiple segment electrode portions 435 and connection electrode portions 2436 in a third electrode region R3 allocated to a portion of a mounting surface 2042a on an opposite side of a second electrode region R2 across a first electrode region R1. In this example, the third electrode region R3 is located on the mounting surface 2042a on the opposite side of the first trajectory T1 across a resistive element 47. The configuration other than that described in the liquid level detecting device 3001 according to the third embodiment is substantially the same as that of the second embodiment (including the configuration of the portion described in the first embodiment). Processing contents in a manufacturing method according to the third embodiment are substantially the same as those of the second embodiment (including the processing contents described in the first embodiment).

According to the liquid level detecting device 3001 of the third embodiment described above, the adjustment electrodes 2434 corresponding to the segment electrodes 430 other than the specific electrode 430b in each electrode group 433 through the cut mark 42b are provided in the opposite side region R3 of the trajectory T1 of the first sliding contact 411 across the resistive element 47. According to the above configuration, even if a relative position between the first sliding contact 411 and the cut mark 42b deviates due to, for example, a manufacturing tolerance, vibration, or the like, the cut mark 42b is less likely to reach the trajectory T1 of the first sliding contact 411. Therefore, a situation in which the sliding contact between the segment electrodes 430 other than the specific electrode 430b in each electrode group 433 and the first sliding contact 411 is hindered by the cut mark 42b due to such a positional deviation can be avoided, and therefore, the productivity can be enhanced without lowering the product quality.

Although multiple embodiments have been described above, the present disclosure is not construed as being limited to these embodiments, and can be applied to various embodiments and combinations within a scope that does not depart from the gist of the present disclosure. Modifications of those embodiments will now be described.

Figure 18:
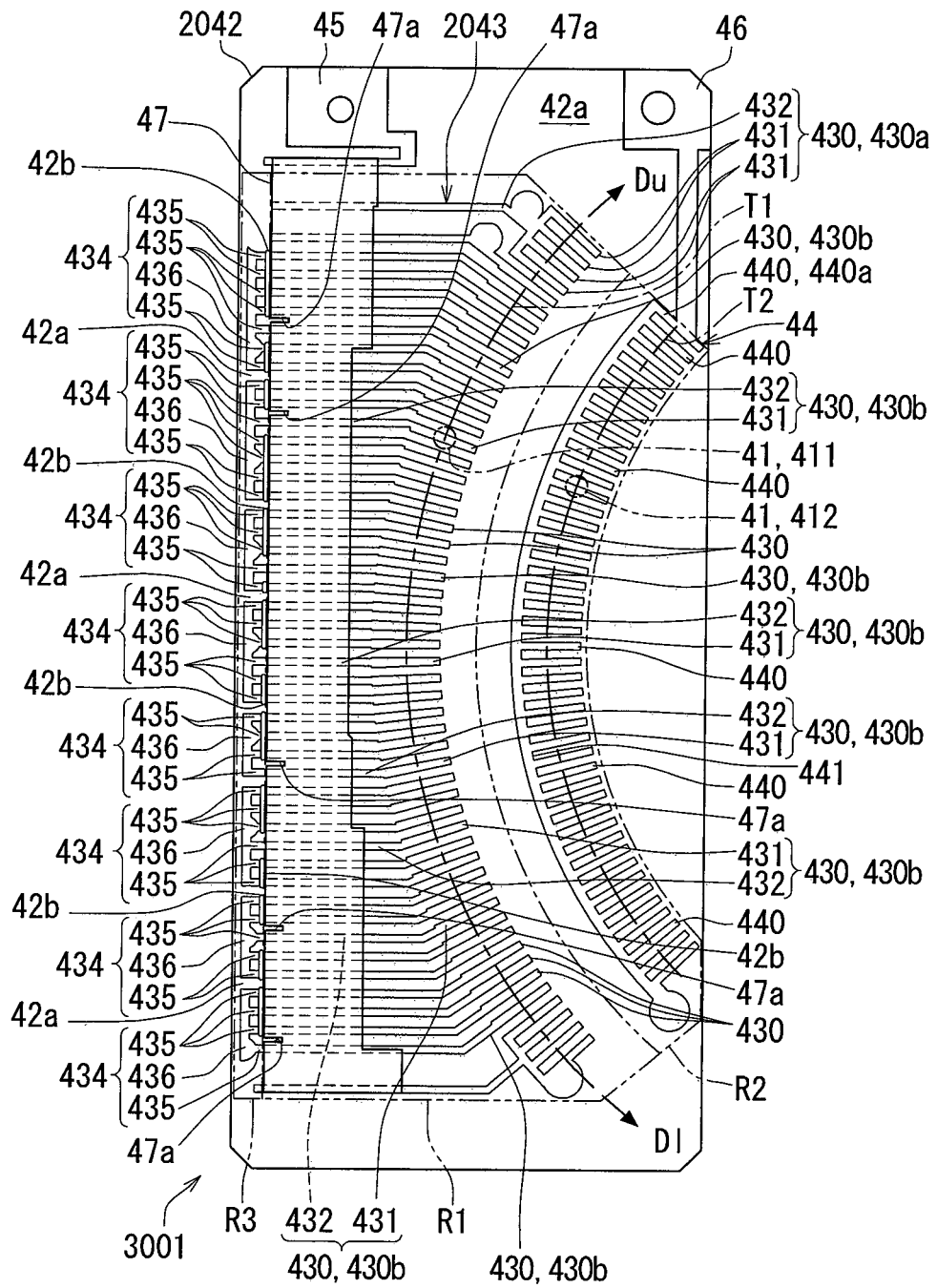
FIG. 18 is a front schematic view showing a modification of FIG. 17.
Figure 19:
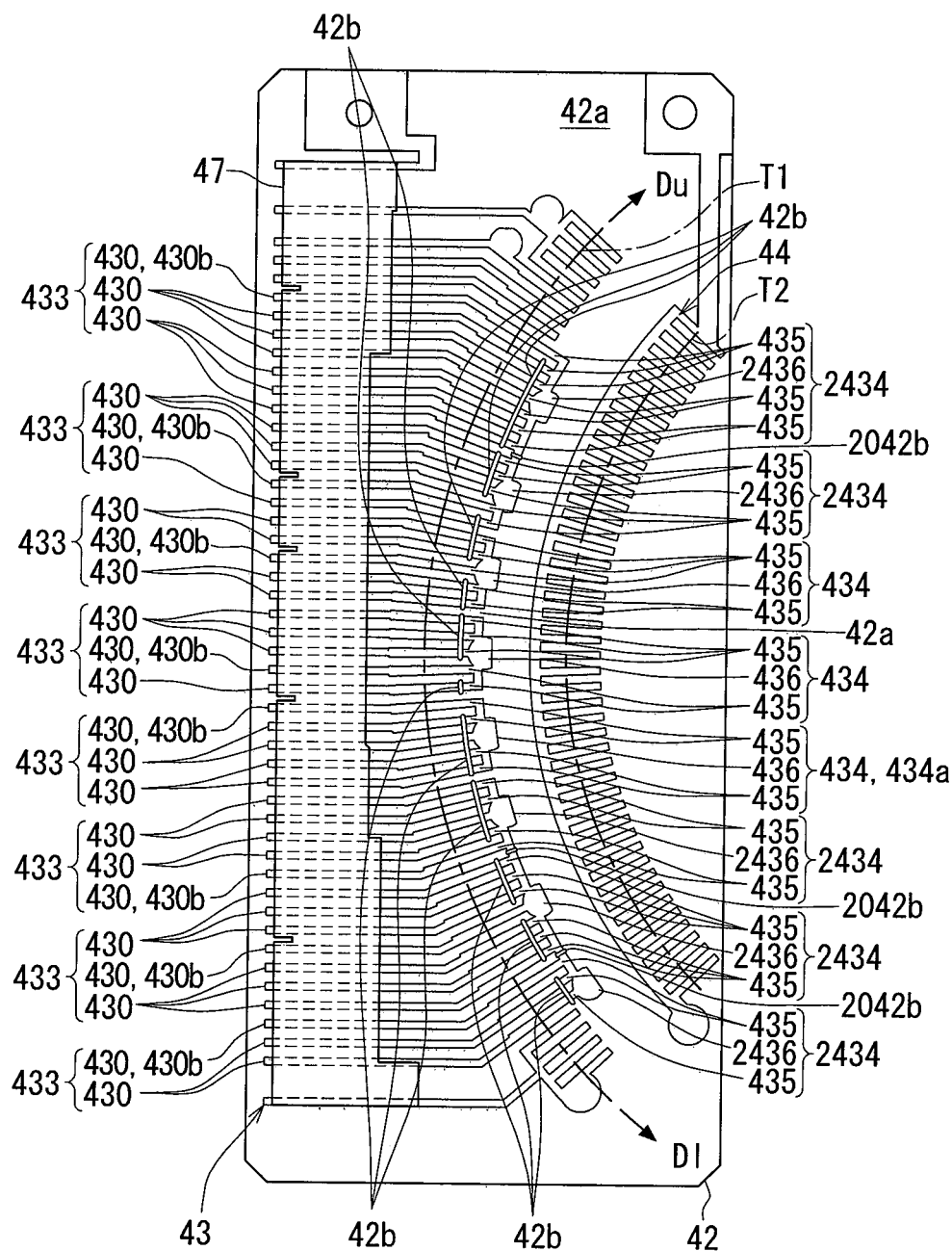
FIG. 19 is a front schematic view showing a modification of FIGS. 3 and 12.

Specifically, as Modification 1 relating to the third embodiment, as shown in FIG. 18, the adjustment electrodes 434 between which the mounting surface 42a is continuous according to the first embodiment may be employed instead of the adjustment electrodes 2434. In Modification 2 relating to the first to third embodiments, as shown in FIG. 19, a predetermined number of adjustment electrodes 434 between which the mounting surface 42a is continuous according to the first embodiment and a predetermined number of adjustment electrodes 2434 between which the cut marks 2042b are interposed according to the second or third embodiment may be employed, respectively. Incidentally, FIG. 19 shows Modification 2 in which the adjustment electrodes 434 according to the first embodiment and the adjustment electrodes 2434 according to the second embodiment are adopted.

Figure 20:
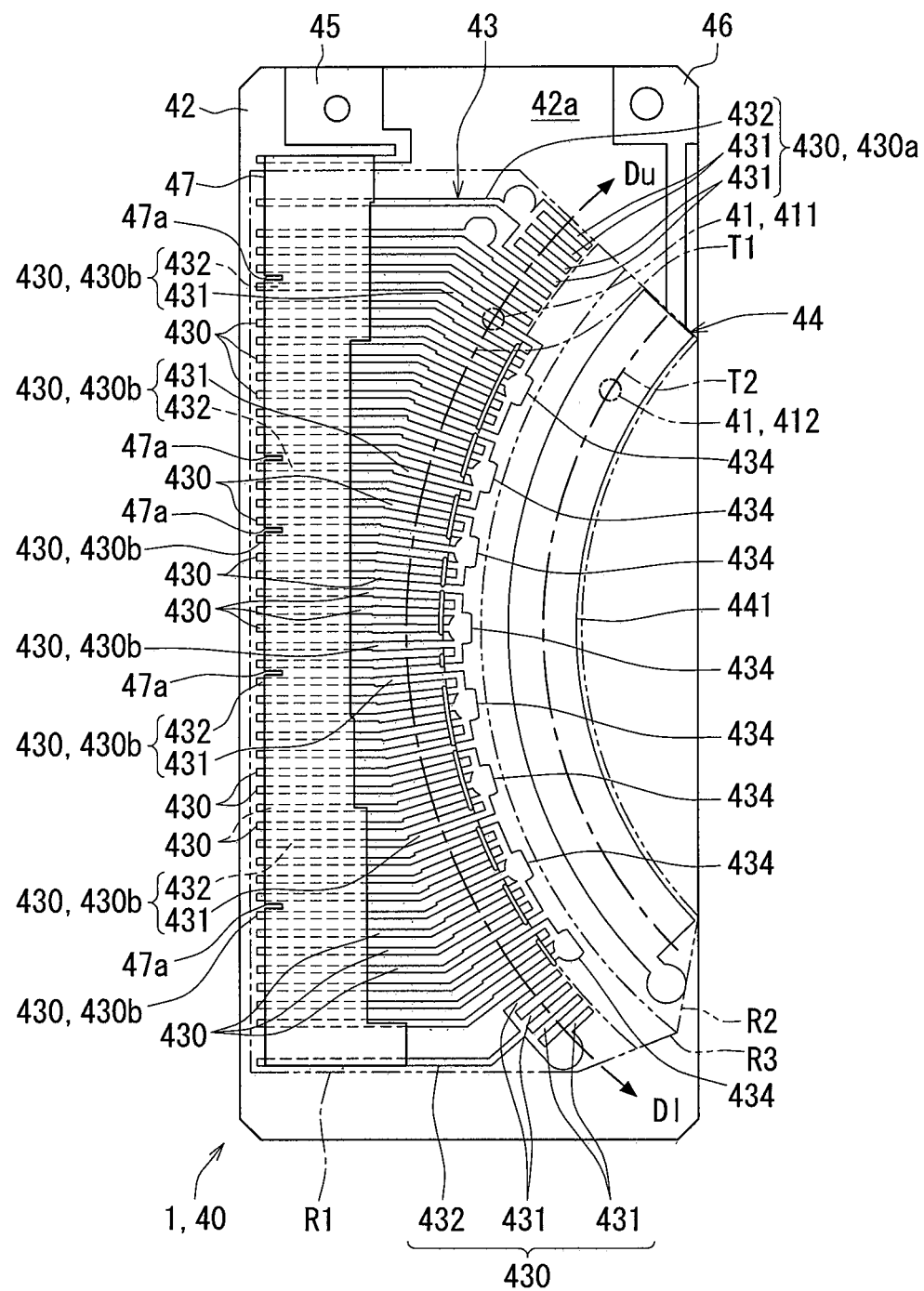
FIG. 20 is a front structural view showing a modification of FIG. 2.

As a modification 3 relating to the first to third embodiments, as shown in FIG. 20, a second fixed electrode 44 composed of only a connection electrode portion 441 having a wide band shape may be adopted. FIG. 20 shows Modification 3 relating to the first embodiment. In Modification 4 relating to the first to third embodiments, the cutting process in S102a may be realized by a method other than the laser trimming, for example, an etching process or the like.

The liquid level detecting device illustrated above for detecting a liquid level L of liquid in a container 2 includes a movable body 30 that includes a sliding contact 411 and is configured to reciprocate according to the liquid level L, a circuit board 42, 2042 that includes a mounting surface 42a, 2042a and is positionally fixed to the container 2, a plurality of segment electrodes 430, 430a that are provided on the mounting surface 42a, 2042a to be aligned in a movement direction Dl, Du of the movable body 30, the sliding contact 411 coming into sliding contact with the plurality of segment electrodes 430, 430a according to a movement of the movable body 30, an output electrode 45 that is provided on the mounting surface 42a, 2042a and is configured to produce an electrical output corresponding to an electrical resistance between the sliding contact 411 and the output electrode 45, a resistive element 47 that is provided on the mounting surface 42a, 2042a and has a higher electrical resistance than the plurality of segment electrodes 430, 430a, the resistive element 47 being located across the plurality of segment electrodes 430, 430a and the output electrode 45 to be electrically connected to the plurality of segment electrodes 430, 430a and the output electrode 45, the plurality of segment electrodes 430, 430a arranged in the movement direction Dl, Du being grouped together to define a plurality of electrode groups 433 each of which includes a predetermined number of segment electrodes 430, 430a, and a plurality of adjustment electrodes 434, 434a, 2434, 2434a that are provided on the mounting surface 42a, 2042a corresponding to the plurality of electrode groups 433 respectively. Each of the plurality of adjustment electrodes 434, 434a, 2434, 2434a is electrically connected to a specific electrode 430b, which is a specific segment electrode 430, 430a in a corresponding one of the plurality of electrode groups 433, to have its electrical resistance adjusted in advance with respect to the output electrode 45. The circuit board 42, 2042 includes a cut mark 42b recessed from the mounting surface 42a, 2042a between the predetermined number of segment electrodes 430, 430a other than the specific electrode 430b in each of the plurality of electrode groups 433 and a corresponding one of the plurality of adjustment electrodes 434, 434a, 2434, 2434a.

Consequently, the electrical resistance between the output electrode and each of the adjustment electrodes electrically connected to one of the segment electrodes in each of the electrode groups corresponding to the specific electrode is adjusted in advance. Therefore, the electrical resistance between the sliding contact and the output electrode in sliding contact can be accurately determined for each specific electrode electrically connected to the corresponding adjustment electrode in each electrode group. Further, in each electrode group in which a predetermined number of the segment electrodes arrayed in the movement direction are classified, the electrical resistance between the sliding contact which is in sliding contact and the output electrode can be accurately determined according to an array pitch even for the other segment electrodes with reference to the specific electrode. As described above, in order to determine the electrical resistance of each segment electrode, since the electrical resistance of each adjustment electrode which is smaller than the total number of the segment electrodes may be adjusted, the productivity can be enhanced.

Furthermore, a cut mark recessed from the mounting surface of the circuit board is confirmed between the segment electrode other than the specific electrode in each electrode group and the corresponding adjustment electrode. In this case, in a state in which all the segment electrodes of each electrode group and the corresponding adjustment electrodes are electrically connected to each other, the cutting process is performed between the segment electrodes other than the specific electrode in each electrode group and the corresponding adjustment electrodes, thereby being capable of providing the cut mark. From the above fact, if the cutting portions between all the segment electrodes in each electrode group and the corresponding adjustment electrodes are changed in accordance with the product specification, the electrical resistance in each segment electrode can be determined as described above, thereby being capable of contributing to realization of high productivity.

The above-illustrated method for manufacturing the liquid level detecting device includes an electrode forming step S101, in which all of the predetermined number of segment electrodes 430, 430a in each of the plurality of electrode groups 433 are formed to be electrically connected to a corresponding one of the plurality of adjustment electrodes 434, 434a, 2434, 2434a, and a resistance adjustment step S102, in which portions between the predetermined number of segment electrodes 430, 430a other than the specific electrode 430b in each of the plurality of electrode groups 433 and a corresponding one of the plurality of adjustment electrodes 434, 434a, 2434, 2434a are cut to form the cut mark 42b recessed from the mounting surface 42a, 2042a, adjusting the electrical resistance between each of the plurality of adjustment electrodes 434, 434a, 2434, 2434a for a corresponding one of the plurality of electrode groups 433 and the output electrode 45.

Accordingly, after all the segment electrodes of each electrode group and the corresponding adjustment electrode are formed in an electrical connection state, the portion between the segment electrodes other than the specific electrode in each electrode group and the corresponding adjustment electrode is cut so as to form a cut mark. According to this, if the cutting points between all the segment electrodes of each electrode group and the corresponding adjustment electrodes are changed in accordance with the product specification, the electrical resistance of each segment electrode can be determined according to the first aspect as described above, thereby being capable of contributing to realization of high productivity.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. A liquid level detecting device for detecting a liquid level of liquid in a container, comprising:
    a movable body that includes a sliding contact and is configured to reciprocate according to the liquid level;
    a circuit board that includes a mounting surface and is positionally fixed to the container;
    a plurality of segment electrodes that are provided on the mounting surface to be aligned in a movement direction of the movable body, wherein the sliding contact is configured to be in sliding contact with the plurality of segment electrodes according to a movement of the movable body;
    an output electrode that is provided on the mounting surface and is configured to produce an electrical output corresponding to an electrical resistance between the sliding contact and the output electrode;
    a resistive element that is provided on the mounting surface and has a higher electrical resistance than the plurality of segment electrodes, wherein:
        the resistive element is located across the plurality of segment electrodes and the output electrode to be electrically connected to the plurality of segment electrodes and the output electrode; and
        the plurality of segment electrodes arranged in the movement direction are grouped together to define a plurality of electrode groups each of which includes a predetermined number of segment electrodes; and
    a plurality of adjustment electrodes that are provided on the mounting surface corresponding to the plurality of electrode groups respectively, wherein:
        each of the plurality of adjustment electrodes is electrically connected to a specific electrode, which is a specific segment electrode in a corresponding one of the plurality of electrode groups, to have its electrical resistance adjusted in advance with respect to the output electrode; and
        the circuit board includes a cut mark recessed from the mounting surface between the predetermined number of segment electrodes other than the specific electrode in each of the plurality of electrode groups and a corresponding one of the plurality of adjustment electrodes.

2. The liquid level detecting device according to claim 1, wherein:
    the plurality of adjustment electrodes, which correspond to the plurality of electrode groups respectively, are provided in a region on the mounting surface on an opposite side of a trajectory from the resistive element; and
    the sliding contact is configured to pass through the trajectory in accordance with the reciprocation of the movable body.

3. The liquid level detecting device according to claim 1, wherein the plurality of adjustment electrodes, which correspond to the plurality of electrode groups respectively, are provided in a region on the mounting surface on an opposite side of the resistive element from a trajectory, through which the sliding contact is configured to pass in accordance with the reciprocation of the movable body.

4. The liquid level detecting device according to claim 1, wherein the circuit board has its mounting surface continued between each adjacent two of the plurality of adjustment electrodes formed by printing corresponding to the plurality of electrode groups respectively, the each adjacent two of the plurality of adjustment electrodes arranged in the movement direction.

5. The liquid level detecting device according to claim 1, wherein the circuit board includes a cut mark recessed from the mounting surface between each adjacent two of the plurality of adjustment electrodes formed by printing corresponding to the plurality of electrode groups respectively, the each adjacent two of the plurality of adjustment electrodes arranged in the movement direction.

6. A method for manufacturing the liquid level detecting device recited in claim 1, comprising:
   performing an electrode forming step, in which all of the predetermined number of segment electrodes in each of the plurality of electrode groups are formed to be electrically connected to a corresponding one of the plurality of adjustment electrodes; and
   performing a resistance adjustment step, in which portions between the predetermined number of segment electrodes other than the specific electrode in each of the plurality of electrode groups and a corresponding one of the plurality of adjustment electrodes are cut to form the cut mark recessed from the mounting surface, adjusting the electrical resistance between each of the plurality of adjustment electrodes for a corresponding one of the plurality of electrode groups and the output electrode.

7. The method of manufacturing the liquid level detecting device according to claim 6, wherein in the electrode forming step, the plurality of adjustment electrodes respectively corresponding to the plurality of electrode groups are formed by printing to leave the continued mounting surface between each adjacent two of the plurality of adjustment electrodes arranged in the movement direction.

8. The method of manufacturing the liquid level detecting device according to claim 6, wherein:
   in the electrode forming step, the plurality of adjustment electrodes respectively corresponding to the plurality of electrode groups are formed by printing to be electrically connected between each adjacent two of the plurality of adjustment electrodes arranged in the movement direction; and
   in the resistance adjustment step, a portion between each adjacent two of the plurality of adjustment electrodes corresponding to the plurality of electrode groups respectively is cut to form a cut mark recessed from the mounting surface, the each adjacent two of the plurality of adjustment electrodes arranged in the movement direction.

* * * * *